(12) United States Patent
Backman et al.

(10) Patent No.: US 10,439,944 B2
(45) Date of Patent: Oct. 8, 2019

(54) HANDLING OF TRAFFIC FLOWS IN A COMMUNICATIONS SYSTEM

(71) Applicant: Telefonaktiebolaget LM Ericsson (publ), Stockholm (SE)

(72) Inventors: Jan Backman, Kärna (SE); Fredrik Garneij, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 97 days.

(21) Appl. No.: 15/300,230

(22) PCT Filed: Mar. 31, 2014

(86) PCT No.: PCT/EP2014/056426
§ 371 (c)(1),
(2) Date: Sep. 28, 2016

(87) PCT Pub. No.: WO2015/149831
PCT Pub. Date: Oct. 8, 2015

(65) Prior Publication Data
US 2017/0149670 A1    May 25, 2017

(51) Int. Cl.
*H04L 12/851* (2013.01)
*H04L 12/721* (2013.01)
(Continued)

(52) U.S. Cl.
CPC .......... *H04L 47/2441* (2013.01); *H04L 45/38* (2013.01); *H04L 45/507* (2013.01);
(Continued)

(58) Field of Classification Search
CPC ..... H04L 45/38; H04L 45/507; H04L 45/741; H04L 47/20; H04L 47/2441; H04L 45/64; H04L 67/327; H04L 47/2408
See application file for complete search history.

(56) References Cited

U.S. PATENT DOCUMENTS 9,038,151 B1 * 5/2015 Chua ...................... H04L 45/02
                                                        709/223
9,179,007 B1 * 11/2015 Yadav .................... H04M 15/66
(Continued)

FOREIGN PATENT DOCUMENTS

EP       2928115 A1 * 10/2015 ......... H04L 12/4633
RU       2364039 C2    8/2009
(Continued)

OTHER PUBLICATIONS

Lara et al., "Simplifying network management using Software Defined Networking and OpenFlow", Dec. 2012, in Proc. IEEE International Conference on Advanced Networks and Telecommunciations Systems (ANTS), pp. 24-29.*
(Continued)

*Primary Examiner* — Un C Cho
*Assistant Examiner* — Shah M Rahman
(74) *Attorney, Agent, or Firm* — Withrow & Terranova, PLLC

(57) ABSTRACT

The embodiments herein relate to a method in a policy node configured to handle traffic flows in a communications system. The policy node allocates a label-setting identifying a label, a particular traffic flow that will pass through a SDN, and one or more destinations for the particular traffic flow. The policy node transmits information indicating the label-setting to a SDNC configured to create a path for the traffic flow through the SDN based on the label and said one or more destinations identified by the label-setting. The policy node allocates a filter-setting defining that the particular traffic flow should be associated with the label. The policy node transmits information indicating the filter-setting to a classifying node configured to receive the particular traffic flow and to associate the particular traffic flow with the label.

14 Claims, 11 Drawing Sheets

(51) Int. Cl.
  *H04L 12/715* (2013.01)
  *H04L 12/813* (2013.01)
  *H04L 29/08* (2006.01)
  *H04L 12/723* (2013.01)
  *H04L 12/749* (2013.01)

(52) U.S. Cl.
  CPC ............ *H04L 45/64* (2013.01); *H04L 45/741* (2013.01); *H04L 47/20* (2013.01); *H04L 67/327* (2013.01); *H04L 47/2408* (2013.01)

(56) References Cited

U.S. PATENT DOCUMENTS

| | | | |
|---|---|---|---|
| 9,252,972 B1* | 2/2016 | Dukes | H04L 12/569 |
| 9,258,742 B1* | 2/2016 | Pianigiani | H04L 67/327 |
| 9,319,311 B2* | 4/2016 | Wang | H04L 45/306 |
| 9,319,338 B2* | 4/2016 | Padmanabhan | G06F 9/45558 |
| 9,450,817 B1* | 9/2016 | Bahadur | H04L 45/64 |
| 9,647,937 B1* | 5/2017 | Dukes | H04L 49/70 |
| 2004/0013089 A1* | 1/2004 | Taneja | H04L 47/14 370/235 |
| 2004/0114518 A1 | 6/2004 | MacFaden et al. | |
| 2006/0092976 A1 | 5/2006 | Lakshman et al. | |
| 2009/0300207 A1* | 12/2009 | Giaretta | H04L 12/1403 709/232 |
| 2012/0300615 A1* | 11/2012 | Kempf | H04W 24/02 370/216 |
| 2013/0176850 A1* | 7/2013 | Mishra | H04L 49/00 370/235 |
| 2013/0272305 A1 | 10/2013 | Lefebvre et al. | |
| 2013/0333029 A1* | 12/2013 | Chesla | H04L 45/74 726/22 |
| 2014/0105062 A1* | 4/2014 | McDysan | H04L 45/306 370/254 |
| 2014/0105216 A1* | 4/2014 | McDysan | H04L 67/1095 370/400 |
| 2014/0244851 A1* | 8/2014 | Lee | H04L 12/4641 709/228 |
| 2015/0043589 A1* | 2/2015 | Han | H04L 45/38 370/392 |
| 2016/0173338 A1* | 6/2016 | Wolting | H04L 41/145 709/223 |
| 2016/0191348 A1* | 6/2016 | Lee | H04L 43/028 709/224 |

FOREIGN PATENT DOCUMENTS

| | | |
|---|---|---|
| RU | 2473171 C2 | 1/2013 |
| WO | 2010099513 A2 | 9/2010 |
| WO | 2013144747 A1 | 10/2013 |
| WO | 2014028612 A1 | 2/2014 |

OTHER PUBLICATIONS

McKeown et al., "OpenFlow: Enabling Innovation in Campus Networks", Apr. 2008, ACM SIGCOMM Computer Communication Review, vol. 38, No. 2, pp. 69-74.*

Stallings, W., "Software-Defined Networks and OpenFlow", Mar. 2013, The Internet Protocol Journal, vol. 16, No. 1, pp. 1-6.*

Newman, D., "Technology Validation Experiment: IPv6 and Multicast Support on OpenFlow", Feb. 11, 2014, https://scholar.google.com/scholar?hl=en&as_sdt=5%2C47&sciodt=0%2C47&cites=1404072664893083469&scipsc=&q=Technology+Validation+Experiment%3A+IPv6+and+Multicast+Support+on+OpenFlow&btnG=, pp. 1-7.*

McKeown et al., "OpenFlow: enabling innovation in campus networks," Apr. 2008, SIGCOMM Comput. Commun. Rev., pp. 69-74. (Year: 2008).*

Translation of the Official Action and Search Report for Russian Patent Application No. 2016142371, dated Nov. 22, 2017, 6 pages.

Lin, Haizhuo, et al., "Apply Embedded Openflow MPLS Technology on Wireless Openflow—OpenRoads," 2nd International Conference on Consumer Electronics, Communications and Networks (CECNet), Apr. 21-23, 2012, IEEE, pp. 916-919.

Luo, Mon-Yen, et al., "Software Defined Networking across Distributed Datacenters over Cloud," IEEE International Conference on Cloud Computing Technology and Science, Dec. 2-5, 2013, IEEE, 8 pages.

International Search Report and Written Opinion for International Patent Application No. PCT/EP2014/056426, dated Dec. 4, 2014, 12 pages.

Author Unknown, "OpenFlow 1.2: OpenFlow Switch Specification," Version 1.2, Dec. 5, 2011, The Open Networking Foundation, 83 pages.

Examination Report for European Patent Application No. 14714268.1, dated Jan. 24, 2019, 6 pages.

* cited by examiner

HANDLING OF TRAFFIC FLOWS IN A COMMUNICATIONS SYSTEM

This application is a 35 U.S.C. § 371 national phase filing of International Application No. PCT/EP2014/056426, filed Mar. 31, 2014, the disclosure of which is incorporated herein by reference in its entirety.

TECHNICAL FIELD

Embodiments herein relate generally to a policy node, a method in the policy node, a classifying node, a method in the classifying node, a Software Defined Network Controller (SDNC), a method in the SDNC, a computer program product and a computer program. More particularly the embodiments herein relate to handling traffic flows in a communications system.

BACKGROUND

Software Defined Network/Networking (SDN) involves decoupling network control from forwarding functions and allowing a centralized network controller to control the behaviour of the entire network. Thus, a network operator may, via high level SDN controller, specify the behaviour of the entire network compared to conventional networks in which the network operator needs to perform low level configuration of each device in order to specify the behaviour of the network. The static architecture of conventional networks are not known to be optimal for today's constantly changing dynamic traffic patterns, increasing storage needs, increased network complexity etc. One of the purposes of the SDN is to overcome these shortcomings of such conventional networks. In other words, a SDN enables flexible implementation of networks that may be dynamically provisioned.

Service chaining is a concept that has obtained increased importance with the rise of SDN. A service chain may be described as at least one service in a specific order and chained together to provide a complete service. Service chaining may be described as a mechanism for creating service chains and forwarding traffic flows through the chains. The forwarding of the traffic flows may be based on subscription. With SDNs, network operators are enabled to dynamically handle (e.g. create, modify, remove) service chains. A traffic flow may be forwarded through a service path in a service chain, and there may be multiple service paths in a service chain. A traffic flow may consist of data packets.

Currently, service chaining is mostly done through selection of individual user sessions with five-tuple filtering for every hop in the service chain. Another solution is that all selected traffic need to pass a service, independent of whether it is needed, just to simplify the traffic steering rules. In other words, without service chaining, all traffic flows need to pass a service for it to affect the traffic that is actually is interested in.

A problem with existing solutions is that they are scaling poorly for either the number of different traffic paths that may be handled (due to complexity to configure and set up), or the number of users that may be steered into the different traffic paths (due to the number of rules that need to be maintained to select them).

Another problem is that the scaling in the downlink direction is troublesome independent of the problems above as it is always scaling poorly for the number of users/sessions in line with the problem regarding that the number of users that may be steered into the different traffic paths as mentioned above.

Furthermore for Layer 2 (L2)—based service chaining, services, also referred to as applications, are unaware of the topology in the network and the applications/services will then in most cases destroy the tagging/chain data on L2 and a new classification is needed by the network to restore the tagging/chain data once an application/service has been applied to a traffic flow.

When selecting a path through several services for a specific flow, the total number of rules that need to be maintained throughout the path is a problem.

SUMMARY

An objective of embodiments herein is therefore to obviate at least one of the above disadvantages and to provide improved handling of traffic flows in a communications system.

According to a first aspect, the objective is achieved by a method in a policy node configured to handle traffic flows in a communications system. The policy node allocates a label setting identifying a label, a particular traffic flow that will pass through a SDN and one or more destinations for the particular traffic flow. The policy node transmits information indicating the label-setting to a SDNC configured to create a path for the traffic flow through the SDN based on the label and said one or more destinations identified by the label setting. The policy node allocates a filter setting defining that the particular traffic flow should be associated with the label. The policy node transmits information indicating the filter setting to a classifying node configured to receive the particular traffic flow and to associate the particular traffic flow with the label.

According to a second aspect, the objective is achieved by a method in a classifying node configured to receive and handle traffic flows in a communications system. The classifying node receives from a policy node, information indicating a filter setting defining that a particular traffic flow should be associated with a label. The classifying node classifies received traffic flows based on the filter setting such that the particular traffic flow is identified. The classifying node associates, based on the classification, the particular traffic flow with the label such that the particular traffic flow comprises the label. The classifying node transmits the particular traffic flow comprising the label to the SDN switch in a SDN. The SDN switch is configured to pass the traffic flow through the SDN based on the label.

According to a third aspect, the objective is achieved by a method in a SDNC configured to handle traffic flow in a communications system. The SDNC receives information indicating a label setting from a policy node. The label setting identifies a label, a particular traffic flow that will pass through a SDN controlled by the SDNC, and one or more destinations for the particular traffic flow. The SDNC creates, based on said one or more destinations, a path setting comprising the label and a path for the particular traffic flow through the SDN. The SDNC transmits information indicating the path setting to one or more SDN switches in the SDN.

According to a fourth aspect, the objective is achieved by a policy node configured to handle traffic flows in a communications system. The policy node is further configured to allocate a label setting identifying a label, a particular traffic flow that will pass through a SDN and one or more destinations for the particular traffic flow. The policy node is configured to transmit information indicating the label-setting to a SDNC configured to create a path for the traffic flow through the SDN based on the label and said one or more destinations identified by the label setting. The policy node is configured to allocate a filter setting defining that the particular traffic flow should be associated with the label. Furthermore, the policy node is configured to transmit information indicating the filter setting to a classifying node configured to receive the particular traffic flow and to associate the particular traffic flow with the label.

According to a fifth aspect, the objective is achieved by a classifying node configured to receive and handle traffic flows in a communications system. The classifying node is further configured to receive from a policy node, information indicating a filter setting defining that a particular traffic flow should be associated with a label. The classifying node is configured to classify received traffic flows based on the filter setting such that the particular traffic flow is identified. The classifying node is further configured to associate based on the classification, the particular traffic flow with the label such that the particular traffic flow comprises the label. Furthermore, the classifying node is configured to transmit the particular traffic flow comprising the label to a SDN switch in a SDN. The SDN switch is configured to pass the traffic flow through the SDN based on the label.

According to a sixth aspect, the objective is achieved by a SDNC configured to handle traffic flow in a communications system. The SDNC being further configured to receive information indicating a label-setting from a policy node. The label-setting identifies a label, a particular traffic flow that will pass through a SDN controlled by the SDNC and one or more destinations for the particular traffic flow. The SDNC is configured to create, based on said one or more destinations, a path-setting comprising the label and a path for the particular traffic flow through the SDN. The SDNC is further configured to transmit information indicating the path-setting to one or more SDN switches in the SDN.

Since the traffic flow is steered through a set of services based on the label-setting, the handling of traffic flows in the communication system is improved. The label may, on the ingress of a chain of destinations be set to indicate the path to traverse, and then all sessions matching the label may be steered on that alone, instead of creating rules per matching traffic flow or group of traffic flows.

Embodiments herein afford many advantages, of which a non-exhaustive list of examples follows:

An advantage of the embodiments herein may be that it is a simple solution and is valid for both Internet Protocol version 4 (IPv4) and Internet Protocol version 6 (IPv6).

Another advantage of the embodiments herein is that they may be scalable in terms of supporting more rules compared to the number of rules supported by known techniques using the same type of hardware, such as SDN switches. Furthermore, the embodiments herein may be future proof since they are based on IPv6, i.e. a solution based on IPv6 is also applicable for IPv4.

Furthermore, another advantage of the embodiments herein may be that they are associated with Layer 3 (L3), i.e. the IP, which makes them transparent to the underlying network topology, e.g. possible alteration of the packets in a traffic flow made in connection with layers below Layer 3 will typically not affect the embodiments described herein.

Another advantage of the embodiments herein may be that all session matching the label may be steered on the label alone, instead of creating rules per matching traffic flow or group of traffic flows.

Furthermore, another advantage of the embodiments herein may be that the label may transparently pass through most services, unless the services are explicitly instructed and/or configured to modify it.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1:
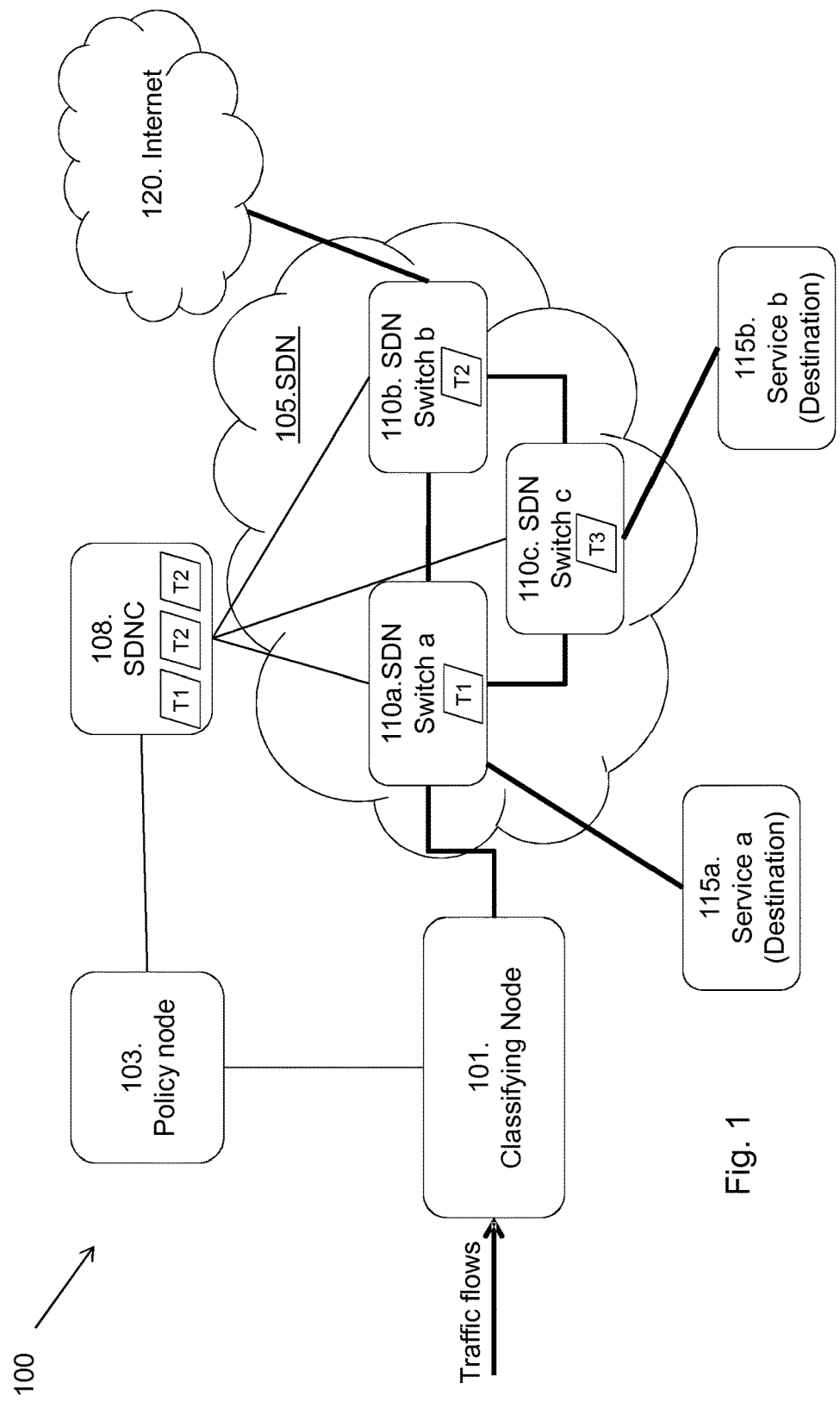
FIG. 1 is a schematic block diagram illustrating embodiments of a communication system.

FIG. 1 depicts a communications system 100 in which embodiments herein may be implemented. The communications system 100 may in some embodiments apply to one or more radio access technologies such as for example Long Term Evolution (LTE), LTE Advanced, future versions of LTE, Wideband Code Division Multiple Access (WCDMA), Global System for Mobile Communications (GSM), or any other Third Generation Partnership Project (3GPP) radio access technology, or other radio access technologies such as e.g. Wireless Local Area Network (WLAN).

The communications system illustrated in FIG. 1 comprises a classifying node 101. The classifying node 101 is a node which is adapted to perform classification. The classifying node 101 may be a gateway node such as e.g. a Packet Data Network Gateway (PGW). The classifying node 101 may comprise a Deep Packet Inspection (DPI) function. The classifying node 101 may be located within e.g. a core network (not shown in FIG. 1) of a telecommunications network, at the periphery of the core network, or at a periphery of a SDN 105 or within the SDN 105. The classifying node 101 is configured to receive a particular traffic flow and to associate a particular traffic flow with a label, which will be described in more detail below. A traffic flow may comprise one or more data packets such as e.g. an IPv4 or IPv6 packet.

The communication system 100 further comprises a policy node 103. The policy node 103 may be e.g. a Policy and Charging Rules Function (PCRF) node or similar. The policy node 103 may be connected to the classifying node 101. The policy node 103 may be located outside the SDN 105, e.g. within a core network.

A SDNC 108 is also comprised in the system 100. The SDNC 108 may be located outside or inside the SDN 105, e.g. it may be located within a core network or it may be located inside the SDN 105. The SDNC 108 is adapted to control the SDN 105. The SDNC 108 may comprise information provided in e.g. a plurality of tables, T1, T2, T3, which will be described in more detail later. The SDNC 108 is adapted to communicate with the policy node 103. The SDNC 108 is configured to create a path for a traffic flow through the SDN 105 based on a label and one or more destinations identified by a label-setting. The label and label-setting will be described in more detail below.

The SDN 105 comprises a plurality of SDN switches 110. In FIG. 1, the SDN 105 is exemplified to comprise three SDN switches 110, i.e. SDN switch a 110a, SDN switch b 110b and SDN switch c 110c. The SDN 105 may comprise any other suitable number of SDN switches 110 than the one exemplified in FIG. 1. When the reference number 110 is used in the following, it refers to any of the SDN switches in the SDN 105, unless otherwise is explicitly stated or follows from the context. Each SDN switch 110 may comprise information in the form of e.g. a table. For example, SDN switch a 110a may comprise table T1, SDN switch b 110b may comprise table T2 and SDN switch 110c c may comprise table T3. The tables are provided by the SDNC 108 to the SDN switches 110. These tables will be described in more detail later. Each SDN switch 110 is adapted to be controlled by the SDNC 108. At least one of the SDN switches 110 in the SDN 105 is adapted to communicate with the classifying node 101. In some embodiments, one of the SDN switches 110, e.g. SDN switch a 110a is collocated with the classifying node 101. Such collocated node is a node having both a switching capability and a classifying capability. The SDN switch 110 is configured to pass the traffic flow through the SDN 105 based on a label, which will described in more detail below.

A SDN switch 110 may be associated with a service 115. A service 115 may e.g. be a service which provides parental control for a traffic flow, it may be a firewall, it may be a service which is related to charging or authentication etc. A service 115 is associated with or connected to the SDN 105, but is preferably located outside the SDN 105. For example, SDN switch a 110a may be associated with service a 115a, i.e. it may pass the traffic flow to service a 115a, and SDN switch c 110c may be associated with service b 115b, i.e. it may pass the traffic flow to service b 115b. When the reference number 115 is used in the following, it refers to any of the services, unless otherwise is explicitly stated or follows from the context. A service may be described as an application which may comprise a function that provides a service to a traffic flow. A service which a traffic flow passes in a service chain may be referred to as a Transparent Value-Added Service (TVAS).

At least one of the SDN switches 110 may be associated with another network, e.g. such as the Internet 120. In FIG. 1, it is exemplified that SDN switch b 110b is associated with Internet 120, however any other of the SDN switches 110 may also or instead be associated with another network such as e.g. the Internet 120 or similar.

The service 115 and the Internet 120 may also be referred to as destinations. This may also be seen as a destination provides a service. A destination may be a final or intermediate destination for a traffic flow. A service destination 115 may be an intermediate destination, i.e. a service destination may not be a final destination. In the following, the reference numbers 115, 120 will refer to a destination, regardless of whether the destination is a service 115, Internet 120, intermediate destination or a final destination. A destination (intermediate or final) may be configured to provide a service to be applied to the particular traffic flow, and the intermediate destination may provide one or more services in a service chain.

The thick black lines in FIG. 1 illustrate at least one incoming traffic flow. As seen in FIG. 1, the traffic flow enters the classifying node 101, goes further through the SDN 105 in the most efficient way which may involve at least one of SDN switch a 110a, SDN switch b 110b, SDN switch c 110c, service a 115a, service b 115, service c 115a and internet 120. For example, a particular traffic flow that only has the internet 120 as end destination may pass SDN switch a 110a and SDN switch b 110b, but not SDN switch c 110c unless there are congestions or breakdown of communication between SDN switch a 110a and SDN switch b110b. In case of a congestion of breakdown, the traffic flow may for example pass through SDN switch a 110a, SDN switch c 110c and SDN switch b 110b on its way to the Internet 120. Thus, a particular traffic flow may pass some or all SDN switches 110 in the SDN 105 and some or all services 115 in a service chain associated with and/or reachable via the SDN 105. The most efficient path a particular traffic flow will take is determined by the SDNC 108. The path of the traffic flow will be described in more detail with reference to FIG. 2 below.

It should be noted that the links in the communications system 100 illustrated in FIG. 1 may be of any suitable kind comprising either a wired or wireless link. The link may use any suitable protocol depending on type and level of layer (e.g. as indicated by the Open Systems Interconnection (OSI) model) as understood by the person skilled in the art.

Figure 2A:
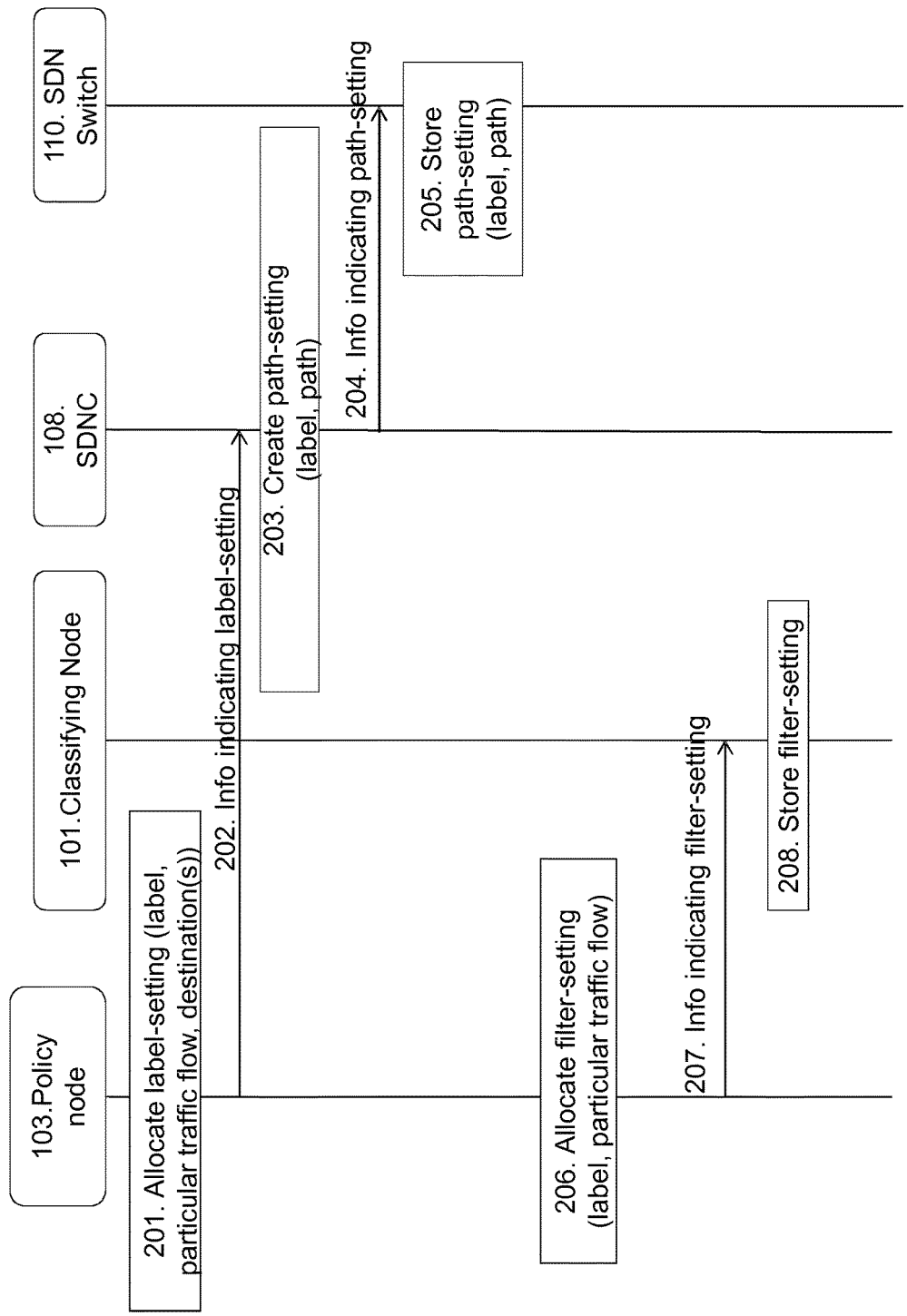
FIG. 2a-2b are signaling diagrams illustrating embodiments of a method.
Figure 2B:
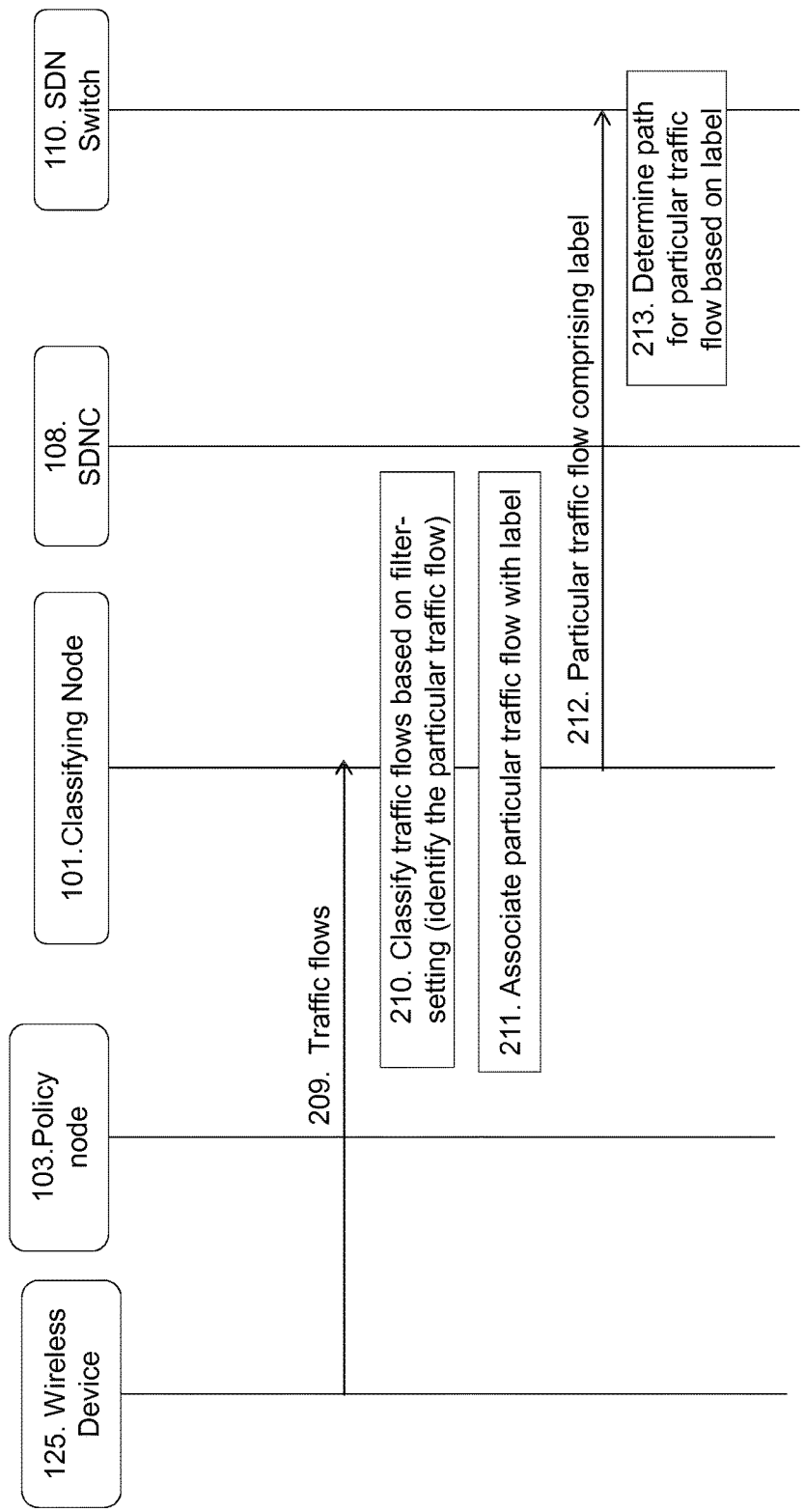

A method for handle traffic flows in a communications system 100 according to some embodiments will now be described with reference to the signalling diagrams depicted in FIGS. 2a and FIG. 2b. FIG. 2a illustrates steps 201-208. FIG. 2b is a continuation of FIG. 2b and illustrates steps 209-213. In addition to the units seen in FIG. 1, FIG. 2b also illustrates a wireless device 125 which may be comprised in the communications system 100. The wireless device 125 may be a device by which a subscriber may access services offered by an operator's network and services outside operator's network to which the operators radio access network and core network provide access, e.g. access to the Internet. The wireless device 125 may be any device, mobile or stationary, enabled to communicate in the communications network, for instance but not limited to e.g. user equipment, mobile phone, smart phone, sensors, meters, vehicles, household appliances, medical appliances, media players, cameras, Machine to Machine (M2M) device, Device to Device (D2D) device, Internet of Things (IoT) device or any type of consumer electronic, for instance but not limited to television, radio, lighting arrangements, tablet computer, laptop or Personal Computer (PC). The wireless device 125 may be portable, pocket storable, hand held, computer comprised, or vehicle mounted devices, enabled to communicate voice and/or data, via the radio access network, with another entity, such as another device or a server.

The method illustrated in FIGS. 2a and 2b comprise the following steps, which steps may as well be carried out in another suitable order than described below:

Step 201

This step is illustrated in FIG. 2a. The policy node 103 allocates a label-setting. The label-setting identifies a label, a particular traffic flow that will pass through the SDN 105, and one or more destinations 115 for the particular traffic flow. Thus, the label-setting associates a particular traffic flow with a label and one or more destinations 115, 120 for the particular traffic flow. There may be may be several labels. In some embodiments one traffic flow may be associated with one label only. However, in other embodiments it is preferred that a label is associated with one or more traffic flows, e.g. when different traffic flows are supposed to pass the same services or similar. However, it is typically not preferred that one traffic flow is associated with several labels, even though that may be the case in some particular embodiments. The label may e.g. be unique for the particular traffic flow. A label may be selected based on a selected service chain. Alternatively, the label may e.g. be unique for a particular destination 115 or combination of destinations 115, 120 that a traffic flow will pass. Several different traffic flows that will pass the same destination 115, 120 or the same combination of destinations 115, 120 may be associated with the same label. A destination 115, 120 may be a final destination and/or an intermediate destination. In some embodiments, the destinations 115, 120 may be described as services 115, and these services 115 may be in a service chain. In other embodiments, the destinations 115, 120 may be Internet 120. In some embodiments, the label-setting further identifies the source of the particular traffic flow. The source may e.g. be any type of communication device configured to communicate with the SDN 105 via the classifying node 101, e.g. such as the wireless device 125 shown in FIG. 2b.

Step 202

This step is illustrated in FIG. 2a. When the label-setting has been allocated in step 201, the policy node 103 sends information indicating the label-setting to the SDNC 108. As mentioned above, the SDNC 108 is configured to create a path for the particular traffic flow through the SDN 105 based on the label and said one or more destinations 115, 120 identified by the label-setting, and possibly also based on the source of the particular traffic flow.

Step 203

This step is illustrated in FIG. 2a. When the SDNC 108 has received information indicating the label-setting, the SDNC 108 creates, based on the label-setting identifying the label and one or more destinations 115, 120 and possibly also the source of the particular traffic flow, a path-setting comprising the label and a path for the particular traffic flow through the SDN 105. The path-setting comprises this information or similar organized in for example a table, a tree structure or any other suitable searchable structure capable of comprising information. This step 203 may therefore involve creating one or more tables T1, T2 and T3 or similar as illustrated in FIG. 1. The table, tree or any other suitable searchable structure comprises the information needed for the SDN switch 110, and this path-setting is created by the SDNC 108, i.e. it is created by a central point in the communications system 100.

The SDN 108 creates the tables or similar for the SDN switches from a central point in the network based on a common understanding between the policy node 103, the classifying node 101, and the SDNC 108 of the association of labels and traffic flows, i.e. the policy node 103, the classifying node 101, and the SDNC 108 associates a particular traffic flow with the same particular label. The tables or similar may be the same for all SDN switches in the SDN 105, although some switches may have one or more individual tables or similar. This is radically different from prior art SDNs wherein a set of SDN routers or SDN switches each has a local table and/or local rules or similar being created based on information from the relevant routing protocols and/or surrounding links and/or surrounding routers/switches etc. Such routers/switches will typically comprise different tables depending on the environment surrounding the particular router/switch. As a contrast, the SDN switches according to embodiments of the present disclosure may have the same tables or similar where the tables or similar are created more or less independent of the local environment surrounding a single SDN switch.

An example of table T1 is seen below in table 1. The left column comprises labels and the right column comprises the path associated with the respective label.

TABLE 1

Example of table T1

| Label | Path |
|---|---|
| Label 1 | Path 1 (e.g. a, c, b) |
| Label 2 | Path 2 (e.g. a, service a, b) |
| Label 3 | Path 3 (e.g. a, c, service b, b) |
| Label 4 | Path 4 (e.g. a, service a, c, service b, b) |

As mentioned above, a service 115 and the Internet 120 may be referred to as destinations, and a destination may be a final or intermediate destination for a traffic flow. In the first row in table 1 above and as seen in FIG. 1 label 1 is exemplified to be associated with path 1. Path 1 comprises a, c and b, implying that a traffic flow comprising label 1 that is associated with path 1 is supposed to flow through the SDN 105 via SDN switches a, c and b (i.e. 110a, 110c, 100b respectively) in that order. Similarly, label 2 is exemplified to be associated with path 2 comprising a, service a and a and b, implying that a traffic flow comprising label 2 that is associated with path 2 is supposed to flow through the SDN 105 via the SDN switch a 110a, service a 115a, back to the SDN switch a 110a and then to SDN switch b 110b in that order.

Note that service a 115a may not have access to any labels or paths or similar and it may therefore not be able to perform the forwarding scheme indicated above using labels and paths. However, a service such as service a 115a (and also service b 115b in FIG. 1) may be configured to simply return the traffic flow to the nearest sender (i.e. SDN switch a 110a in case of service a 115a, and SDN switch c 110c in case of service b 115b, see FIG. 1), e.g. based on the identity or address (e.g. IP address) of the sender. Such identity or address may e.g. be provided by the sender.

When a traffic flow comprising e.g. label 2 returns from service a 115a to SDN switch a 110a, then the SDN switch a 110a may review the path and conclude that the traffic flow returning from service a 115a has already been in service a 115a and shall therefore be forwarded from service a 115a to somewhere else than service a 115a, and the table in this case tells the SDN switch a 110a to forward the traffic flow to SDN switch b 110b, since b is the next instance that follows after service a 115a in the path. The SDN switch a 110a may determine that the traffic flow returns from service a 115a e.g. based on the identity or address (e.g. IP address) of the service a 115a. Such identity or address may e.g. be provided by the service a 115a. Alternatively, the SDN switch a 110a may mark the traffic flow when it sends it to service a 115a, and then check the marking when the traffic flow returns from service a 115a, e.g. leave a mark in the label or similar comprised by the traffic flow. Those skilled in the art having the benefit of this disclosure realises that there are many other ways for SDN switch a 110a to discover that the traffic flow is returned from a service a 115a to which the SDN switch 110 previously sent the flow in questions.

If the label is at least part of an IP header in Layer 3, the SDNC 108 may perform its own method steps compared to if the label should be on an Ethernet Layer 2 level.

Step 204

This step is illustrated in FIG. 2a. The SDNC 108 transmits information indicating the created path-setting to the SDN switch 110. In case the SDN 105 comprises a plurality of SDN switches 110, the SDNC 108 transmits information indicating the path-setting to each SDN switch 110. As mentioned above, the information indicating the path-setting may be in the form of a table, a tree structure or any other suitable searchable structure comprising the information. For example, in the case of a table, the SDNC 108 may transmit table T1 to SDN switch a 110a, and table T2 to SDN switch b 110b and table T3 to SDN switch c 110c. An example of such table is seen in Table 1 above. The tables T1, T2 and T3 may comprise the same information, i.e. the SDNC 108 transmits the same table to each SDN switch 110. Alternatively, at least one table may comprise information uniquely specified for a specific SDN switch 110, i.e. the SDNC 108 may transmit different tables to some of the SDN switches 110.

When a SDN switch 110 receives a traffic flow comprising a label it looks in the received table (or similar), finds the label and the path associated with the label, where the path tells the SDN switch 110 where to forward the traffic flow. For example (compare FIG. 1), after a SDN switch c 110c has received a traffic flow comprising label 1, the SDN switch c 110c looks in its path table (e.g. T1), finds label 1 that is associated with a certain path, e.g. comprising a, c, b. Then, since instance c corresponds to SDN switch c 110c itself and since instance b corresponding to SDN switch b is next in the path it enables SDN switch c 110c to conclude that it shall forward the traffic flow to instance b. SDN switch b 110b may e.g. comprise a path table T2. Table T2 may be the same as T1, but it may be a different table, e.g. wherein label 1 is associated with a different path e.g. comprising instances a, b, internet. Thus, if SDN switch c 110c forwards a traffic flow comprising label 10 1 to SDN switch b 110c (as exemplified above) then SDN switch b 110b looks in table T2, finds label 1 associated with a path comprising instances a, b, Internet 120. Since instance b in this path corresponds to the destination of the SDN switch b 110b itself and since destination "internet" is next in the path it enables SDN switch b 110b to conclude that it shall forward the traffic flow to the Internet 120. This is only one example of how a suitable table or similar may be defined. However, any other suitable way is possible for defining tables or similar information structures to be stored in the SDN switches 110 and that enables the SDN switches 110 to associate a label with a path for a particular traffic flow to follow through the SDN 105, when the particular traffic flow comprises the label in question.

Step 205

This step is illustrated in FIG. 2a. The SDN switch 110 may store the information indicating the path-setting received from the SDNC 108. In case the information indicating the path-setting is in the form of a table, the SDN switch 110 may store the received table. Thus, each SDN switch 110 comprises information indicating the path-setting.

Step 206

This step is illustrated in FIG. 2a. The policy node 103 allocates a filter-setting. The filter-setting defines that a particular traffic flow should be associated with a particular label. In the filter-setting each label is preferably associated with a traffic flow in the same or similar manner as each label is associated with a traffic flow by the label-setting allocated in step 201. A filter-setting may be used to set labels in packets, and labels may be used to forward traffic.

The information in the filter-setting indicating the traffic flow(s) is preferably allocated such that the information enables the classifying node 101 to identify the traffic flow(s) in step 210, 703. The information may e.g. indicate the source address of each traffic flow (e.g. source IP address), the source network ID, the source application ID, source port, or destination address of the traffic flow (e.g. destination IP address), destination port, or any other source or destination information or any other information that can be used to identify a traffic flow.

Table 2 below illustrates an example of the association between the label and the particular traffic flow in the filter-setting. The left column comprises information indicating the traffic flow and the right column comprises information indicating the label for the respective traffic flow. As can be seen in table 2, Traffic flow 1 corresponds to Label 1, Traffic flow 2 corresponds to Label 2, Traffic flow 3 corresponds to Label 3, and Traffic flow 4 corresponds to Label 4.

TABLE 2

| Filter-setting | |
| --- | --- |
| Traffic flow | Label |
| Traffic flow 1 | Label 1 |
| Traffic flow 2 | Label 2 |
| Traffic flow 3 | Label 3 |
| Traffic flow 4 | Label 4 |

Step 207

This step is illustrated in FIG. 2a. The policy node 103 sends information indicating the filter-setting to the classifying node 101. The classifying node 101 is, as mentioned above, configured to receive the particular traffic flow(s) and to associate the particular traffic flow(s) with a particular label.

The classifying node 101 needs to know which traffic flow to associate with which label. Once a traffic flow comprises a label and is sent to a SDN switch 110, then the SDN switch 110 comprises its table (e.g. T1) or similar information that enables the SDN switch 110 to look up the label in question and find the associated path that defines how this traffic flow shall flow through the SDN 105.

So, the classifying node 101 knows which traffic flow to mark with which label. The classifying node 101 does not necessarily need to know anything about paths through the SDN 105. The SDN switches 110 know from their tables or similar which path to use for a particular label comprised by a particular traffic flow. The SDN switches 110 do not need to know how the various traffic flows should be associated with the various labels to create a filter-setting to be used by the classifying node 101.

Step 208

This step is illustrated in FIG. 2a. The classifying node 101 may store the received information indicating the filter-setting.

Step 209

This step is illustrated in FIG. 2b. The classifying node 101 receives one or more traffic flows sent by one or more sources, e.g. a wireless device 125. The traffic flow(s) may pass other nodes before it reaches the classifying node 101.

Step 210

This step is illustrated in FIG. 2b. The classifying node 101 classifies the traffic flows received in step 209, preferably based on the filter-setting received in step 208. The result of the classifying is that one or more traffic flows are identified.

For example, a particular traffic flow may be identified based on the source address of the traffic flow (e.g. source IP address), the source network ID, the source application ID, source port, destination address of the traffic flow (e.g. destination IP address), destination port, or any other source or destination determining information or any other information that can be used to identify a traffic flow. Such information enabling an identification of a particular traffic flow may e.g. be comprised or indicated by the information identifying the traffic flow(s) in the filter-setting.

Step 211

This step is illustrated in FIG. 2b. Based on the classification/identification of traffic flows in step 210, the classifying node 101 associates each traffic flow with a label according to the filter-setting such that each particular traffic flow comprises the corresponding label.

For example, assume that traffic flow 1 defined by the filter-setting in table 2 is received by the classifying node 101 in step 209, and that the received traffic flow is identified by the classifying node 101 in step 210. Then the classifying node 101 will associate the identified traffic flow 1 with label 1 such that traffic flow 1 comprises label 1. The label may e.g. be inserted by the classifying node 101 into a header of one or more data packets comprised by traffic flow 1, e.g. as described above with reference to FIG. 4 showing a schematic illustration of an IPv6 header.

Step 212

This step is illustrated in FIG. 2b. The classifying node 101 transmits the identified traffic flows, each comprising the corresponding label, to a SDN switch 110 in the SDN 105. As mentioned earlier, the SDN switch 110 is configured to pass the traffic flow through the SDN 105 based on the label comprised by the traffic flow received from the classifying node 101.

Step 213

This step is illustrated in FIG. 2b. When the SDN switch 110 has received the particular traffic flow comprising the label, the SDN switch 110 may determine a path for the particular traffic flow based on the label, as exemplified in Table 3 below. The SDN switch 110 may check which label the particular traffic flow comprises and then select a path based on the label in the path-setting comprised by the SDN switch 110. In this example the SDN switch 110 may select a path by locating the label and the associated path in the table previously created in step 203, transmitted to the SDN switch 110 in step 204 and stored in the SDN switch 110 in step 205. So, a particular traffic flow may reach a number of destinations 115, 120 on its way through the SDN 105. Such destination 115, 120 may be at least one of an intermediate destination 115 (also referred to as services) and a final destination such as e.g. Internet 120.

Table 3 below illustrates an example of the association between the traffic flow, label, path and destinations 115, 120. The left most column comprises the traffic flow, the left middle column comprises the label which is comprised in the respective traffic flow, the right middle column comprises the path with which the label is associated and the right most column comprises examples of the destinations of the different paths.

TABLE 3

| Traffic flow | Label comprised by the traffic flow | Path with which the label is associated | Instances and destinations of the different paths |
|---|---|---|---|
| Traffic flow 1 | Label 1 | Path 1 | a, c, b |
| Traffic flow 2 | Label 2 | Path 2 | a, service a, b |
| Traffic flow 3 | Label 3 | Path 3 | a c, service b, b |
| Traffic flow 4 | Label 4 | Path 4 | a, service a, c, service b, c, b |

Figure 3:
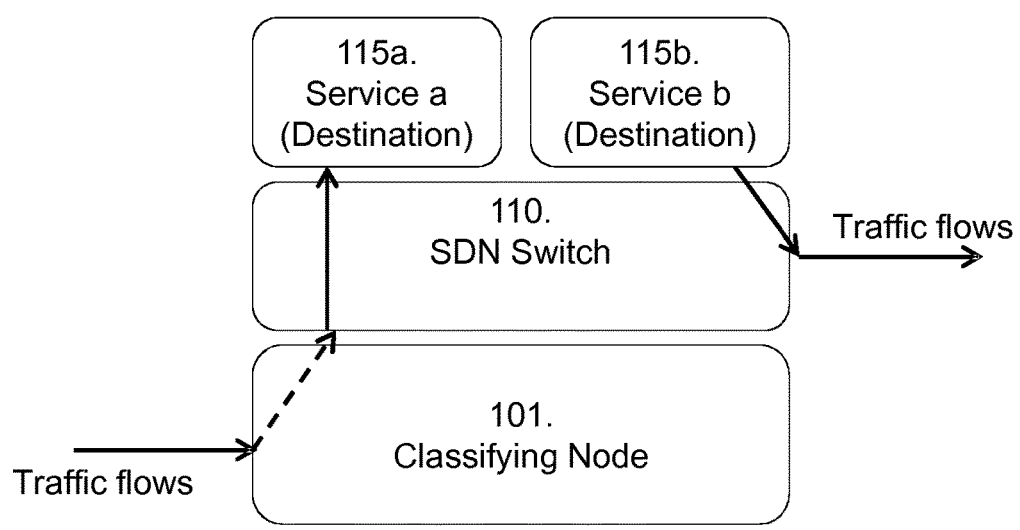
FIG. 3 is a schematic block diagram illustrating embodiments of a traffic flow.

The entities in the communications system 100 which the particular traffic flow may pass through is exemplified in FIG. 3. As seen in FIG. 3, the traffic flow enters the classifying node 101 which performs the classification as described in steps 210 and 211 in FIG. 2b. Then the traffic flow enters the SDN switch 110 (steps 212 and 213 in FIG. 2b), which determines the path for the particular traffic flow based on the path-setting comprised by the SDN switch and the label comprised by the traffic flow.

One SDN switch 110 may only be able to forward a traffic flow to the next instance or destination (e.g. another SDN switch 110, a service 115 or Internet 120). Then, that instance or destination has to forward the traffic flow to the next instance or destination and so on. So, a traffic flow which is received by the SDN switch a 110a from the classifying node 101, may be forwarded by the SDN switch a 110a to the service a 115a or the SDN switch b 110b or the SDN switch c 110c, see FIG. 1. The actual forwarding operatively performed by the individual SDN switch 110 may be done based on the path setting (see steps 204-205), which may for example be represented by tables, information organized in a tree structure or any other suitable searchable structure comprising information. There may be no link or connection between service a 115a and service b 115b in FIG. 1, and a traffic flow that should pass both service a 115a and service b 115b may have to do that by at last passing via the SDN switches a and c 110a and 110c (possibly via all SDN switches a, b, c (i.e. 110a, 110b, 110c respectively), if the connection between the SDN switch a 110a and the SDN switch c 110c is down).

The services a 115a, b 115b may have no tables or similar searchable information-structures After the particular service has been provided to the traffic flow, the traffic flow may for example be returned to the sending address, i.e. in FIG. 1 returned to the SDN switch a 110a or the SDN switch c 110c that originally forwarded the traffic flow to the particular services a 115a, b 115b respectively.

Label

The label mentioned e.g. in step 201 of FIG. 2a will now be described in more detail. The label may be a part of a data packet header of one or more or even all data packets in a particular traffic flow, for example at least a part of an IPv6 or IPv4 header. The label may be at least part of an extension header or a routing header. The label may for example be a flow label or a part of a flow label comprised by the header. In embodiments herein, the flow label is used to determine how to transport the traffic flows in addition to selecting which destinations 115, 120 (that may not be involved in payload transportation or routing) the traffic flows shall pass.

Including the label in the header of a data packet has the advantage that it will not be changed by procedures occurring on lower layers. Embodiments herein include the label in the header of the data packet(s) and are therefore affecting Layer 3 (L3) procedures, i.e. the IP. This makes the embodiments transparent to the underlying network topology, e.g. possible alteration of the packets in a traffic flow, e.g. made by services 115*a*, 115*b* or similar, in connection with layers below Layer 3 will typically not affect the embodiments described herein.

Figure 4:
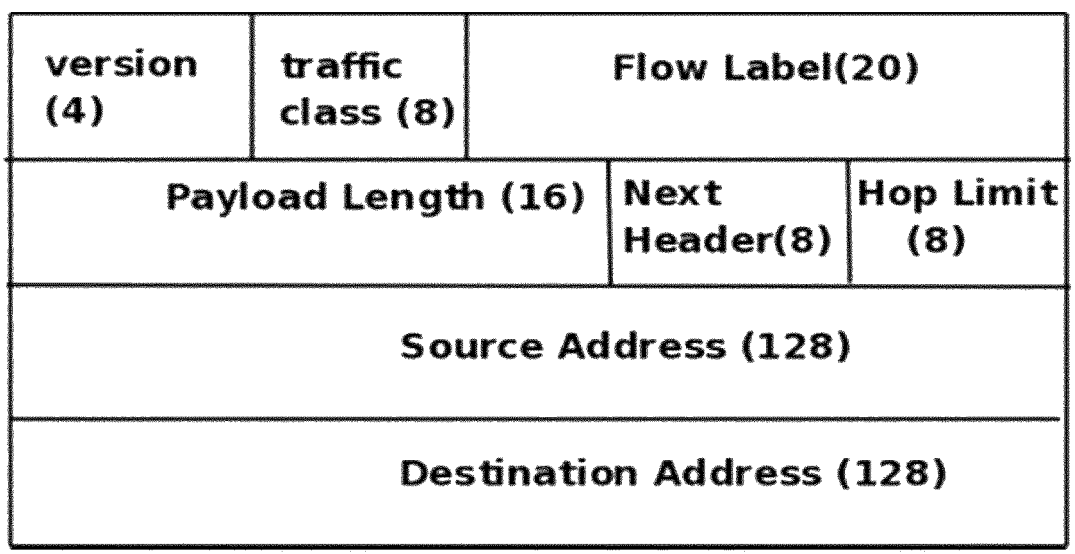
FIG. 4 is a schematic block diagram illustrating embodiments of an IPv6 header.

An example of an IPv6 header is schematically illustrated in FIG. 4. The IPv6 header comprises version (4 bits), traffic class (8 bits), flow label (bits), payload length (16 bits), next header (8 bits), hop limit (8 bits), source address (128 bits) and destination address (128 bits). The label of embodiments described herein may be comprised by the IPv6 flow label or at least be a part of the IPv6 flow label.

Label for Service Chaining or Similar

By using the label, the policy node 103 may set a path identifier indicated by the label for many different traffic flows. This may group several traffic flows into one single path which drastically minimizes the number of rules that has to be distributed in the network, i.e. the SDN 105. Thus, the label may be used as a tag for both selecting processing and functional services.

Labels for Service Identification or Similar

The labels used by embodiments described herein may also be used to identify what services/policies to use within a certain application. For example, a label comprised by a particular traffic flow may correspond to a particular path as described above, and also indicate that a particular processing/service or similar should be applied to the traffic flow by a particular service 115*a* or 115*b* included in the path. Here, the service 115*a*, 115*b* may provide several different processes/services that it may apply to the traffic flow based on the information comprised by the label. This may be seen as a specialization of a service chain, where different chains are implemented within the same application and processing element, hence it may also be used to instantiate the processing within an application.

An example of such a combination may be that a certain label specifies that a traffic flow shall be bit-rate limited to A kbps and re-marked with a DiffServ Code Point (DSCP) with the value C, while another label would specify that the traffic flow shall be bit-rate limited to B kbps and marked with a DiffServ Code Point with the value D.

Traffic Flow Reflection

As traffic flows in most cases would be originating from the wireless device 125 side. However, embodiments herein is equally applicable when the traffic flow originates from the opposite side, e.g. from the internet 120. This implies that the classifying node 101 is arranged such that the traffic flows are received by the classifying node 101, processed as described above, and then sent to SDN switch 110*b*.

Moreover, the traffic flows may enter the SDN 105 without first passing the classifying node 101 as described above, e.g. if only one classifying node 101 is used and some traffic flows enters the SDN from the end where there is no classifying node. In this connection it may be noted that, many protocols run on top of the Transmission Control Protocol (TCP) or another protocol that comprises handshakes before handling the actual payload in the traffic flow. Here, the SDN switch 110 located closest to the internet connection 120 may be seen as a classifier that only has to reflect the classification decisions done in the other direction. Therefor the traffic flow in that (down-link) direction may be derived from the labels in the other direction (up-link). This may require that the traffic flow is using the same SDN node 110 in both directions, or that the results are spread over all potential traffic processing entities.

Traffic Flow Direction

To simplify forwarding even further, the direction of the traffic flow may be encoded into the label. In an embodiment where the label is the flow label in IPv6, one bit out of the twenty bits in the flow label may indicate the direction. This enables for easy handling of bi-directional traffic flows, especially together with the traffic flow reflection above.

IPv4

The IPv4 header does not comprise the flow label as the IPv6 header. In a case where the label is comprised in an IPv4 header, the IPv4 header may therefore be translated into an IPv6 header such that a flow label may be used. The translation from IPv4 to IPv6 may be performed by the wireless device 125, by the PGW or by any other node within the SDN 105 domain.

Figure 5:
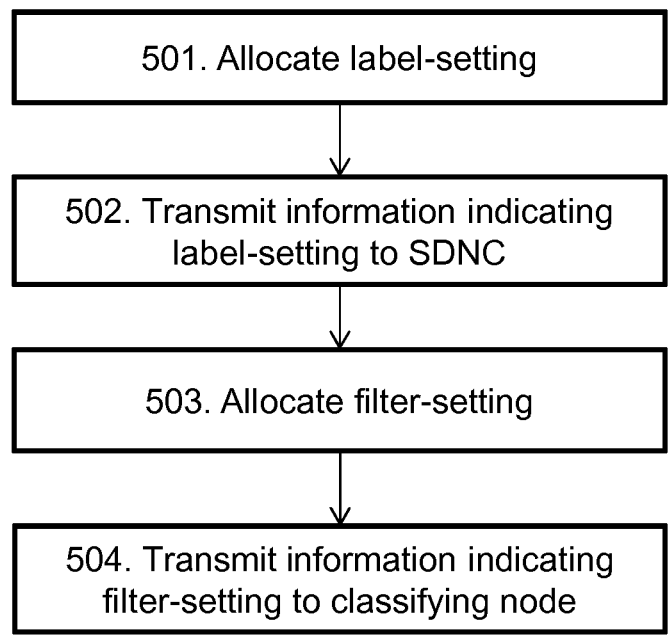
FIG. 5 is a flow chart illustrating embodiments of a method performed by a policy node.

The method described above will now be described seen from the perspective of the policy node 103. FIG. 5 is a flowchart describing the present method in the policy node 103, configured to handle traffic flows in the communications system 100. The policy node 103 may be a PCRF node. The method comprises the following steps to be performed by the policy node 103, which steps may be performed in any suitable order different from the one described below:

Step 501

This step corresponds to step 201 in FIG. 2. The policy node 103 allocates a label-setting identifying a label, a particular traffic flow that will pass through a SDN 105, and one or more destinations 115, 120 for the particular traffic flow. Thus, the label-setting associates a particular traffic flow with a label and one or more destinations 115, 120 for the particular traffic flow.

The label-setting may further indicate a source for the particular traffic flow.

At least one of the destinations 115, 120 may be an intermediate destination 115 configured to provide a service to be applied to the particular traffic flow. The intermediate destination 115 may provide a service in a service chain.

The label may be a part of a data packet header of data packets in the particular traffic flow.

The label may be one of at least a part of a flow label in an IPv6 header in data packets of the particular traffic flow and at least a part of a label in an extension header in data packets of the particular traffic flow.

Step 502

This step corresponds to step 202 in FIG. 2. The policy node 103 transmits information indicating the label-setting to the SDNC 108 configured to create a path for the traffic flow through the SDN 105 based on the label and said one or more destinations 115, 120 identified by the label-setting.

Step 503

This step corresponds to step 206 in FIG. 2. The policy node 103 allocates a filter-setting defining that the particular traffic flow should be associated with the label. In the filter-setting each label is preferably associated with or corresponding to a traffic flow in the same or similar manner as each label is associated with a traffic flow by the label-setting allocated in step 501 and 201 described above.

The information in the filter-setting indicating the traffic flow(s) is preferably allocated such that the information enables the classifying node 101 to identify the traffic flow(s) in step 210, 703. The information may e.g. indicate the source address of each traffic flow (e.g. source IP address), the source network ID, the source application ID, source port, or destination address of the traffic flow (e.g.

destination IP address), destination port, or any other source or destination information or any other information that can be used to identify a traffic flow.

In some embodiments, the filter-setting further indicates a direction of the traffic flow. The direction may be uplink from a wireless device 125 to a base station or downlink from the base station to the wireless device 125.

The filter-setting may further indicate which services or similar to be used at a destination 115, 120 for the particular traffic flow.

The filter-setting for the traffic flow in one direction may be derivable from a label in another direction.

Step 504

This step corresponds to step 207 in FIG. 2. The policy node 103 transmits information indicating the filter-setting to a classifying node 101 configured to receive the particular traffic flow and to associate the particular traffic flow with the label. The classifying node 101 may be a gateway node.

In some embodiments, a computer program may comprise instructions which, when executed on at least one processor, cause the at least one processor to carry out the method steps 501-504. A carrier may comprise the computer program, and the carrier is one of an electronic signal, optical signal, radio signal or computer readable storage medium.

To perform the method steps shown in FIG. 5 for handling traffic flows in the communications system 100, the policy node 103 is configured to handle traffic flows in a communications system 100. The policy node 103 being further configured to allocate a label-setting identifying a label, a particular traffic flow that will pass through a SDN 105 and one or more destinations 115, 120 for the particular traffic flow. The policy node is configured to transmit information indicating the label-setting to the SDNC 108 configured to create a path for the traffic flow through the SDN 105 based on the label and said one or more destinations 115, 120 identified by the label-setting. The policy node is configured to allocate a filter-setting defining that the particular traffic flow should be associated with the label. The policy node is further configured to transmit information indicating the filter-setting to a classifying node 101 configured to receive the particular traffic flow and to associate the particular traffic flow with the label.

In some embodiments, the policy node 103 comprises means adapted to allocate a label-setting identifying a label, a particular traffic flow that will pass through a SDN 105 and one or more destinations 115, 120 for the particular traffic flow. The means is adapted to transmit information indicating the label-setting to the SDNC 108 configured to create a path for the traffic flow through the SDN 105 based on the label and said one or more destinations 115, 120 identified by the label-setting. The means is adapted to allocate a filter-setting defining that the particular traffic flow should be associated with the label. The means is further adapted to transmit information indicating the filter-setting to a classifying node 101 configured to receive the particular traffic flow and to associate the particular traffic flow with the label.

Figure 6:
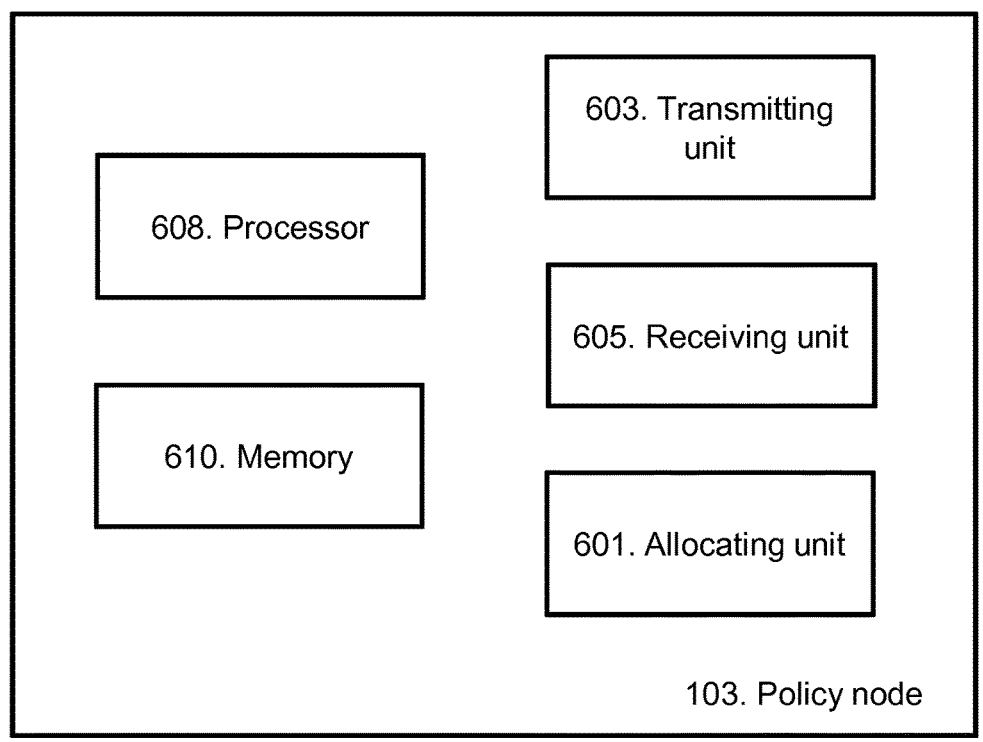
FIG. 6 is a schematic block diagram illustrating embodiments of a policy node.

To perform the method steps shown in FIG. 5 for handling traffic flows in the communications system 100 the policy node 103 may comprise an arrangement as shown in FIG. 6. As mentioned above, the policy node 103 is configured to handle traffic flows in the communications system 100. The policy node 103 may be a PCRF node.

The policy node 103 may comprise an allocating unit 601 adapted to allocate a label-setting identifying a label, a particular traffic flow that will pass through the SDN 105, and one or more destinations 115, 120 for the particular traffic flow. The label-setting may further indicate a source for the particular traffic flow. At least one of the destinations 115, 120 may be an intermediate destination 115 configured to provide a service to be applied to the particular traffic flow. The intermediate destination 115 may provide a service in a service chain. The label may be a part of a data packet header of data packets in the particular traffic flow. The label may be one of at least a part of a flow label in an IPv6 header in data packets of the particular traffic flow and at least a part of a label in an extension header in data packets of the particular traffic flow. The allocating unit 601 may be further adapted to allocate a filter-setting defining that the particular traffic flow should be associated with the label. The filter-setting may further indicate a direction of the traffic flow. The direction may be uplink from a wireless device 125 to a base station or downlink from the base station to the wireless device 125. The filter-setting further may indicate which services to be used at a destination 115, 120 for the particular traffic flow. The filter-setting for the traffic flow in one direction may be derivable from a label in another direction. The allocating unit 601 may also be referred to as an allocating module, an allocating means, an allocating circuit or means for allocating.

The policy node 103 may comprise a transmitting unit 603 which is adapted to transmit information indicating the label-setting to a SDNC 108 configured to create a path for the traffic flow through the SDN 105 based on the label and said one or more destinations 115, 120 identified by the label-setting. The transmitting unit 603 may be further adapted to transmit information indicating the filter-setting to a classifying node 101 configured to receive the particular traffic flow and to associate the particular traffic flow with the label. The classifying node 101 may be a gateway node. The transmitting unit 603 may also be referred to as a transmitting module, a transmitting means, a transmitting circuit, means for transmitting or an output unit. The transmitting unit 603 may be a transmitter, a transceiver etc. The transmitting unit 603 may be a wireless transmitter of the policy node 103 of a wireless or fixed communications system.

The policy node 103 may comprise a receiving unit 605 which is adapted to receive information, messages and signaling from other nodes in the communications system 100. The receiving unit 605 may also be referred to as a receiving module, a receiving means, a receiving circuit, means for receiving or an input unit. The receiving unit 605 may be a receiver, a transceiver etc. The receiving unit 605 may be a wireless receiver of the policy node 103 of a wireless or fixed communications system.

In some embodiments, the policy node 103 comprises a processor 608 and a memory 610. The memory 610 comprises instructions executable by the processor 608.

The memory 610 may comprise one or more memory units. The memory 610 is arranged to be used to store data, received data, power level measurements, label-settings, filter-settings, information, threshold values, time periods, configurations, schedulings, and applications to perform the methods herein when being executed in the policy node 103.

Those skilled in the art will also appreciate that the allocating unit 601, the transmitting unit 603 and the receiving unit 605 described above may refer to a combination of analog and digital circuits, and/or one or more processors configured with software and/or firmware, e.g. stored in a memory, that when executed by the one or more processors such as the processor 608 perform as described above. One or more of these processors, as well as the other digital hardware, may be comprised in a single Application-Specific Integrated Circuit (ASIC), or several processors and various digital hardware may be distributed among several separate components, whether individually packaged or assembled into a System-on-a-Chip (SoC).

Figure 7:
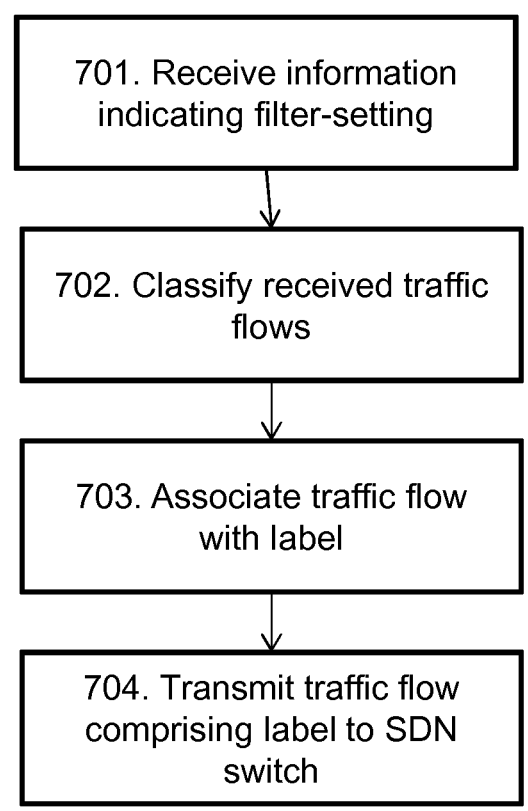
FIG. 7 is a flow chart illustrating embodiments of a method performed by a classifying node.

The method described above will now be described seen from the perspective of the classifying node 101. FIG. 7 is a flowchart describing the present method in the classifying node 101 configured to receive and handle traffic flows in the communications system 100. The classifying node 101 may comprise a Deep Packet Inspection (DPI) function. The classifying node 101 may be a gateway node. The method comprises the following steps to be performed by the classifying node 101, which steps may be performed in any suitable order different from the one described below:

Step 701

This step corresponds to step 207 in FIG. 2. The classifying node 101 receives, from the policy node 103, information indicating a filter-setting defining that a particular traffic flow should be associated with a label.

The information in the filter-setting indicating the traffic flow(s) is preferably allocated such that the information enables the classifying node 101 to identify the traffic flow(s) in step 210, 703.

The label may further indicate a direction of the traffic flow. The direction may be uplink from the wireless device 125 to the SDN 105 or downlink from the SDN 105 to the wireless device 125.

The filter-setting may further indicate which services to be used at a destination 115, 120 for the particular traffic flow.

The filter-setting for the traffic in one direction may be derivable from a label in another direction.

The particular traffic flow may be received from a wireless device 125.

The particular traffic flow may be received from the internet 120 or similar.

Step 702

This step corresponds to step 210 in FIG. 2. The classifying node 101 classifies the traffic flows received in step 209, preferably based on the filter-setting received in step 701. The result of the classifying is that one or more traffic flows are identified. In other words, the classifying node 101 classifies received traffic flows based on the filter-setting such that particular traffic flows are identified.

This step corresponds to step 211 in FIG. 2. Based on the classification/identification of traffic flows in step 702, the classifying node 101 associates each identified traffic flow with a label according to the filter-setting such that each particular traffic flow comprises the corresponding/associated label. The label may e.g. be inserted by the classifying node 101 into a header of one or more data packets comprised by traffic flow in question, e.g. as described above with reference to FIG. 4 showing a schematic illustration of an IPv6 header.

Step 704

This step corresponds to step 212 in FIG. 2. The classifying node 101 transmits the particular traffic flow comprising the label to a SDN switch 110 in the SDN 105. The SDN switch 110 is configured to pass the traffic flow through the SDN 105 based on the label comprised by the traffic flow.

In some embodiments, a computer program may comprise instructions which, when executed on at least one processor, cause the at least one processor to carry out the method steps 701-704. A carrier may comprise the computer program, and the carrier is one of an electronic signal, optical signal, radio signal or computer readable storage medium.

To perform the method steps shown in FIG. 7 for receiving and handling traffic flows in the communications system 100, the classifying node 101 is configured to receive from a policy node 103, information indicating a filter-setting defining that a particular traffic flow should be associated with a label. The classifying node 101 is further configured to classify received traffic flows based on the filter-setting such that the particular traffic flow is identified. The classifying node 101 is configured to associate based on the classification, the particular traffic flow with the label such that the particular traffic flow comprises the label. Furthermore, the classifying node 101 is configured to transmit the particular traffic flow comprising the label to the SDN, switch 110 in the SDN 105. The SDN switch 110 is configured to pass the traffic flow through the SDN 105 based on the label.

In some embodiments, the classifying node 101 comprises means adapted to receive from a policy node 103, information indicating a filter-setting defining that a particular traffic flow should be associated with a label. The means may be further adapted to classify received traffic flows based on the filter-setting such that the particular traffic flow is identified. The means may be adapted to associate based on the classification, the particular traffic flow with the label such that the particular traffic flow comprises the label. Furthermore, the means may be adapted to transmit the particular traffic flow comprising the label to the SDN, switch 110 in the SDN 105. The SDN switch 110 is configured to pass the traffic flow through the SDN 105 based on the label.

Figure 8:
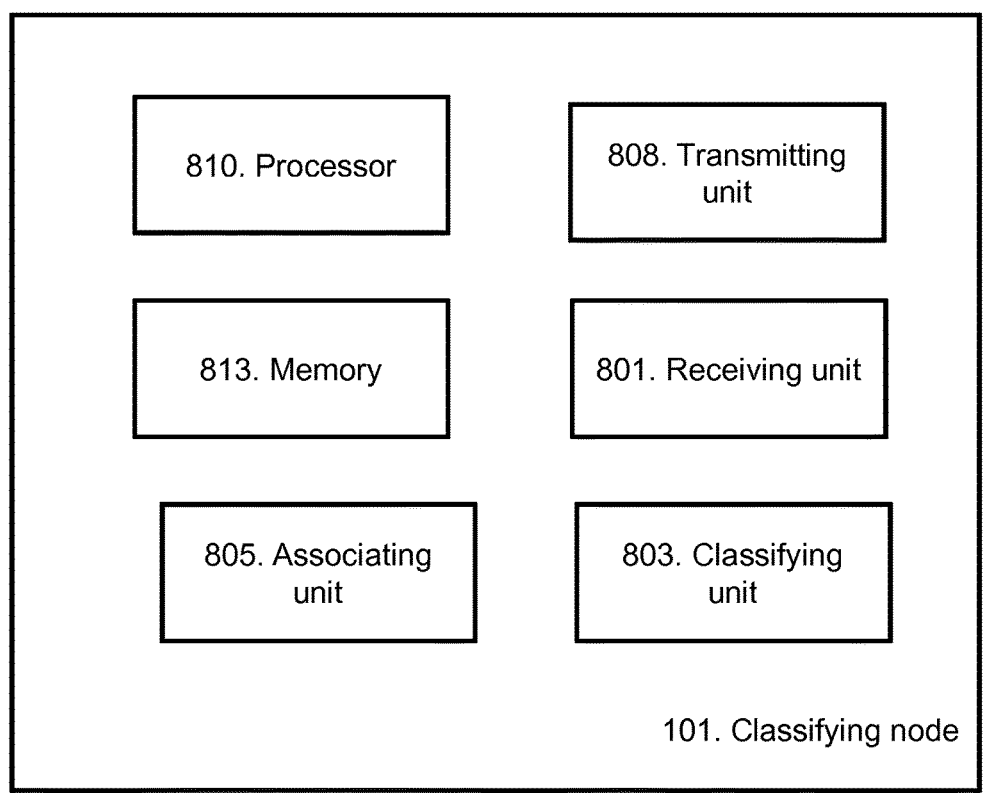
FIG. 8 is a schematic block diagram illustrating embodiments of a classifying node.

To perform the method steps shown in FIG. 7 for receiving and handling traffic flows in the communications system 100 the classifying node 101 may comprise an arrangement as shown in FIG. 8. The classifying node 101 may be a gateway node.

The classifying node 101 may comprise a receiving unit 801 which is adapted to receive from the policy node 103, information indicating a filter-setting defining that a particular traffic flow should be associated with a label. The label may further indicate a direction of the traffic flow. The direction may be uplink from a wireless device 125 to a base station or downlink from the base station to the wireless device 125. At least one destination 115, 120 for the particular traffic flow may be an intermediate destination 115 configured to provide a service to be applied to the particular traffic flow. The intermediate destination 115 may provide a service in a service chain. The filter-setting may further indicate which services to be used at a destination 115, 120 for the particular traffic flow. The filter-setting for the traffic in one direction may be derivable from a label in another direction. The label may be a part of a data packet header of data packets in the particular traffic flow. The label may be one of at least a part of a flow label in an IPv6 header of data packets in the particular traffic flow and at least a part of a label in an extension header in data packets of the particular traffic flow. The particular traffic flow may be received from a wireless device 125. The policy node 103 may be a PCRF node. The receiving unit 801 may also be referred to as a receiving module, a receiving means, a receiving circuit, means for receiving or an input unit. The receiving unit 801 may be a receiver, a transceiver etc. The receiving unit 801 may be a wireless receiver of the classifying node 101 of a wireless or fixed communications system.

The classifying node 101 may comprise a classifying unit 803 which is adapted to classify received traffic flows based on the filter-setting such that the particular traffic flow is identified.

The classifying unit 803 may also be referred to as a classifying module, a classifying means, a classifying circuit or means for classifying.

The classifying node 101 may comprise an associating unit 805 which is adapted to associate based on the classification, the particular traffic flow with the label such that the particular traffic flow comprises the label. The associating unit 805 may also be referred to as an associating module, an associating means, an associating circuit or means for associating.

The classifying node 101 may comprise a transmitting unit 808 adapted to transmit the particular traffic flow comprising the label to the SDN switch 110 in the SDN 105. The SDN switch 110 is configured to pass the traffic flow through the SDN 105 based on the label. The transmitting unit 808 may also be referred to as a transmitting module, a transmitting means, a transmitting circuit, means for transmitting or an output unit. The transmitting unit 808 may be a transmitter, a transceiver etc. The transmitting unit 808 may be a wireless transmitter of the classifying node 101 of a wireless or fixed communications system.

In some embodiments, the classifying node 101 comprises a processor 810 and a memory 813. The memory 813 comprises instructions executable by the processor 810.

The memory 813 may comprise one or more memory units. The memory 813 is arranged to be used to store data, received data, power level measurements, label-settings, filter-settings, labels, classifications, information, threshold values, time periods, configurations, schedulings, and applications to perform the methods herein when being executed in the classifying node 101.

Those skilled in the art will also appreciate that the receiving unit 801, the classifying node 803, the associating unit 805 and the transmitting unit 808 described above may refer to a combination of analog and digital circuits, and/or one or more processors configured with software and/or firmware, e.g. stored in a memory, that when executed by the one or more processors such as the processor 810 perform as described above. One or more of these processors, as well as the other digital hardware, may be comprised in a single ASIC, or several processors and various digital hardware may be distributed among several separate components, whether individually packaged or assembled into a SoC.

Figure 9:
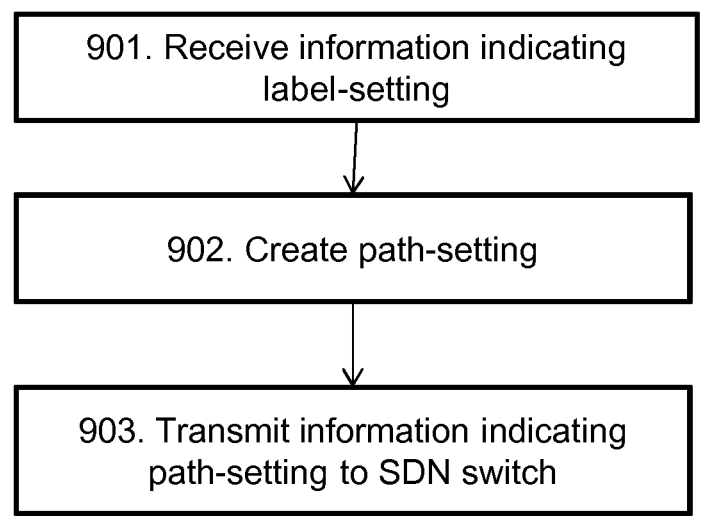
FIG. 9 is a flow chart illustrating embodiments of a method performed by a SDNC.

The method described above will now be described seen from the perspective of the SDNC 108. FIG. 9 is a flowchart describing the present method in the SDNC 108, for handling traffic flows in the communications system 100. The SDNC 108 may be located outside the SDN 105 and the SDN switch may be 110 located in the SDN 105. The method comprises the following steps to be performed by the SDNC 108, which steps may be performed in any suitable order than described below:

Step 901

This step corresponds to step 202 in FIG. 2a. The SDNC 108 receives information indicating a label-setting from a policy node 103. The label-setting identifies a label, a particular traffic flow that will pass through the SDN 105 controlled by the SDNC 108, and one or more destinations 115, 120 for the particular traffic flow.

The label-setting may further indicate a source for the particular traffic flow.

At least one destination 115, 120 for the particular traffic flow may be an intermediate destination 115 configured to provide a service to be applied to the particular traffic flow. The intermediate destination 115 may provide a service in a service chain.

The label-setting may further indicate a direction of the traffic flow. The direction may be uplink from the wireless device 125 to the SDN 105 or downlink from the SDN 105 to the wireless device 125.

The label-setting may further indicate which services to be used at a destination 115, 120 for the particular traffic flow.

The label may be a part of a data packet header of data packets in the particular traffic flow.

The label may be one of: at least a part of a flow label in an IPv6 header in data packets of the particular traffic flow and at least a part of a label in an extension header in data packets of the particular traffic flow.

In some embodiments, the SDNC 108 and the classifying node 101 have a common understanding of the label.

The policy node 103 may be a PCRF node and the classifying node 101 may be a gateway node.

Step 902

This step corresponds to step 203 in FIG. 2. The SDNC 108 creates, based on the label-setting identifying the label and one or more destinations 115, 120, a path-setting comprising the label and a path for the particular traffic flow through the SDN 105, e.g. as exemplified in table 1 discussed above.

Step 903

This step corresponds to step 204 in FIG. 2. The SDNC 108 transmits information indicating the path-setting to one or more SDN switches 110 in the SDN 105.

In some embodiments, a computer program may comprise instructions which, when executed on at least one processor, cause the at least one processor to carry out the method steps 901-903. A carrier may comprise the computer program, and the carrier is one of an electronic signal, optical signal, radio signal or computer readable storage medium.

To perform the method steps shown in FIG. 9 for handling traffic flows in the communications system 100, the SDNC 108 is configured to receive information indicating a label-setting from the policy node 103. The label-setting identifies a label, a particular traffic flow that will pass through the SDN 105 controlled by the SDNC 108, and one or more destinations 115, 120 for the particular traffic flow. The SDNC 108 is further configured to create, based on said one or more destinations 115, 120, a path-setting comprising the label and a path for the particular traffic flow through the SDN 105. The SDNC 108 is configured to transmit information indicating the path-setting to one or more SDN switches 110 in the SDN 105.

In some embodiments, the SDNC 108 comprises means adapted to receive information indicating a label-setting from a policy node 103. The label-setting identifies a label, a particular traffic flow that will pass through the SDN 105 controlled by the SDNC 108, and one or more destinations 115, 120 for the particular traffic flow. The means is further adapted to create, based on said one or more destinations 115, 120, a path-setting comprising the label and a path for the particular traffic flow through the SDN 105. The means is further adapted to transmit information indicating the path-setting to one or more SDN switches 110 in the SDN 105.

Figure 10:
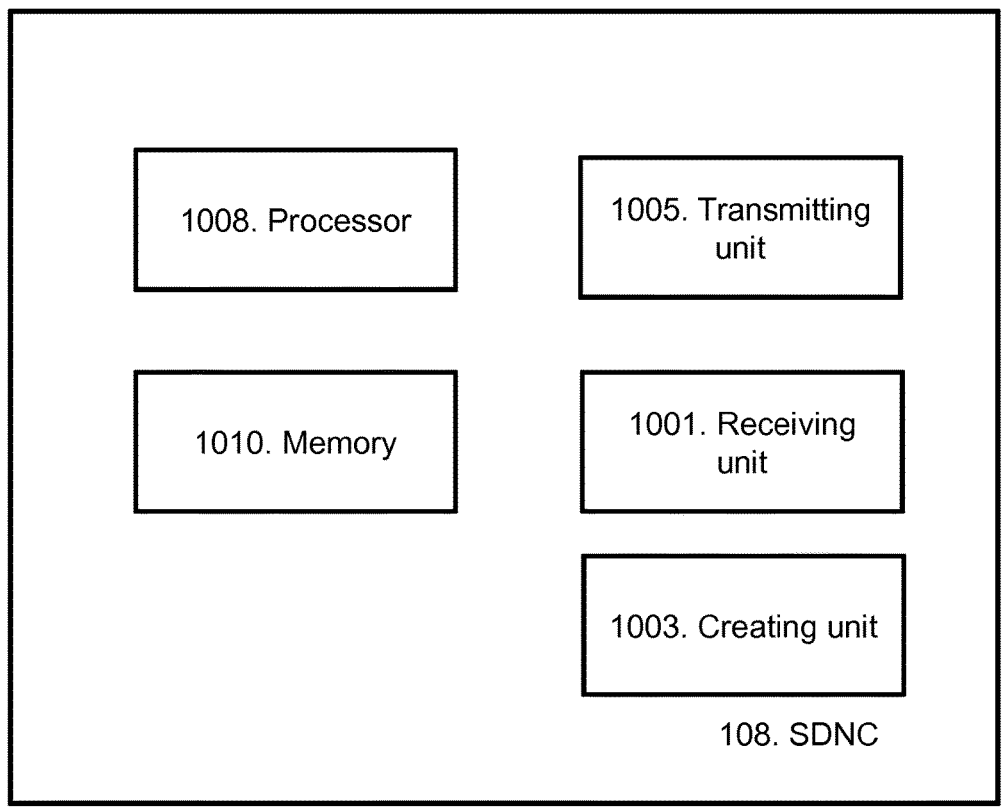
FIG. 10 is a schematic block diagram illustrating embodiments of a SDNC.

To perform the method steps shown in FIG. 9 for handling traffic flows in the communications system 100 the SDNC 108 may comprise an arrangement as shown in FIG. 10. The SDNC 108 may be located outside the SDN 105 and the SDN switch 110 is located in the SDN 105.

The SNDC 108 may comprise a receiving unit 1001 which is adapted to receive information indicating a label-setting from a policy node 103. The label-setting identifies a label, a particular traffic flow that will pass through SDN 105 controlled by the SDNC 108, and one or more destinations 115, 120 for the particular traffic flow. The label-setting may further indicate a source for the particular traffic flow. At least one destination 115, 120 for the particular traffic flow may be an intermediate destination 115 configured to provide a service to be applied to the particular traffic flow. The intermediate destination 115 may provide a service in a service chain. The label-setting may further indicates which services to be used at a destination 115, 120 for the particular traffic flow. The label may be a part of a data packet header of data packets in the particular traffic flow. The label may be one of: at least a part of a flow label in an IPv6 header in data packets of the particular traffic flow and at least a part of a label in an extension header in data packets of the particular traffic flow. The policy node 103 may be a PCRF node, and the classifying node 101 may be a gateway node. The receiving unit 1001 may also be referred to as a receiving module, a receiving means, a receiving circuit, means for receiving or an input unit. The receiving unit 1001 may be a receiver, a transceiver etc. The receiving unit 1001 may be a wireless receiver of the SDNC 108 of a wireless or fixed communications system.

The SNDC 108 may comprise a creating unit 1003 which is adapted to create, based on said one or more destinations 115, 120, a path-setting comprising the label and a path for the particular traffic flow through the SDN 105. The filter-setting for the traffic in one direction may be derivable from a label in another direction. The SDNC 108 and the classifying node 101 may have a common understanding of the label. The creating unit 1003 may also be referred to as a creating module, a creating means, a creating circuit or means for creating.

The SNDC 108 may comprise a transmitting unit 1005 which is adapted to transmit information indicating the path-setting to one or more SDN switches 110 in the SDN 105. The transmitting unit 1005 may also be referred to as a transmitting module, a transmitting means, a transmitting circuit, means for transmitting or an output unit. The transmitting unit 1005 may be a transmitter, a transceiver etc. The transmitting unit 1008 may be a wireless transmitter of the SDNC 108 of a wireless or fixed communications system.

In some embodiments, the SDNC 108 comprises a processor 1008 and a memory 1010. The memory 1010 comprises instructions executable by the processor 1008.

The memory 1010 may comprise one or more memory units. The memory 1010 is arranged to be used to store data, received data, power level measurements, label-settings, filter-settings, labels, classifications, information, threshold values, time periods, configurations, schedulings, and applications to perform the methods herein when being executed in the SDNC 108.

Those skilled in the art will also appreciate that the receiving unit 1001, the creating unit 1003 and the transmitting unit 1005 described above may refer to a combination of analog and digital circuits, and/or one or more processors configured with software and/or firmware, e.g. stored in a memory, that when executed by the one or more processors such as the processor 1008 perform as described above. One or more of these processors, as well as the other digital hardware, may be comprised in a single ASIC, or several processors and various digital hardware may be distributed among several separate components, whether individually packaged or assembled into a SoC.

The present mechanism for handling traffic flows in a communication system 100 may be implemented through one or more processors, such as a processor 608 in the policy node 103, a processor 810 in the classifying node 101 and a processor 1008 in the SDNC 108, together with computer program code for performing the functions of the embodiments herein. The processor may be for example a Digital Signal Processor (DSP), ASIC processor, Field-programmable gate array (FPGA) processor or microprocessor. The program code mentioned above may also be provided as a computer program product, for instance in the form of a data carrier carrying computer program code for performing the embodiments herein when being loaded into at least one of the policy node 103, the classifying node 101 and the SDNC 108. One such carrier may be in the form of a CD ROM disc. It is however feasible with other data carriers such as a memory stick. The computer program code may furthermore be provided as pure program code on a server and downloaded to at least one of the policy node 103, the classifying node 101 and the SDNC 108.

Via the policy node 103, it is possible according to the embodiments herein to coordinate the labelling of the traffic flows before they are treated by the SDNC 108, i.e. on IP level. The communications system 100 may therefore be seen as comprising an associative connection between the classifying node 101 and the SDNC 108.

In planned service chaining solutions, there are ideas to use tagging of traffic on lower layers, i.e. L2 (most commonly Ethernet) to identify a service chain. When selecting a path through several services for a specific traffic flow, the total number of rules that need to be maintained throughout the path may be a problem. The embodiments herein may drastically decrease the number of rules that need to be maintained and has a potential to hugely simplify the solution.

Furthermore, the embodiments herein may be associated with Layer 3 (L3), i.e. the IP, which makes them transparent to the underlying network topology. The idea here is to use the flow-label in the IPv6 header and steer traffic through a set of services based on that. The flow label may on the ingress of a chain of services be set to indicate the path to traverse and then all sessions matching that flow-label may be steered on that alone, instead of creating rules per matching flow or group of flows.

A benefit of using the flow label in IPv6 is that it passes transparently through most destinations 115, 120 unless the destinations 115, 120 are instructed and/or configured to modify the label.

Summarized, the classifying node 101 will classify the traffic flows according to the desired policies (what destinations 115, 120 to traverse) and mark the traffic flow with a label. The SDN switches 110 may choose to look at this label to steer the traffic flow to the destination 115, 120. When the traffic flow comes back from the destination 115, 120 the label will still be intact in the traffic flow, the SDN switches 110 may on the label alone select where to send the traffic flow next.

The embodiments herein are not limited to the above described embodiments. Various alternatives, modifications and equivalents may be used. Therefore, the above embodiments should not be taken as limiting the scope of the embodiments, which is defined by the appending claims.

Some embodiments described herein may be summarized in the following manner:

One embodiment is directed to a method in a policy node configured to handle traffic flows in a communications system. The method comprises:

allocating a label setting identifying a label, a particular traffic flow that will pass through a SDN 105, and one or more destinations 115, 120 for the particular traffic flow;

transmitting information indicating the label-setting to a SDNC 108 configured to create a path for the traffic flow through the SDN 105 based on the label and said one or more destinations 115, 120 identified by the label setting;

allocating a filter setting defining that the particular traffic flow should be associated with the label; and transmitting information indicating the filter setting to a classifying node 101 configured to receive the particular traffic flow and to associate the particular traffic flow with the label.

The label setting may further indicate a source for the particular traffic flow.

A least one of the destinations 115, 120 may be an intermediate destination 115 configured to provide a service to be applied to the particular traffic flow.

The intermediate destination 115 may provide a service in a service chain.

The filter setting may further indicate a direction of the traffic flow, which direction is uplink from a wireless device 125 to the SDN 105 or downlink from the SND 105 to the wireless device 125.

The filter setting may further indicate which services to be used at a destination 115, 120 for the particular traffic flow.

The label may be a part of a data packet header of data packets in the particular traffic flow.

The label may be one of: at least a part of a flow label in an Internet Protocol version 6, IPv6, header in data packets of the particular traffic flow or at least a part of a label in an extension header in data packets of the particular traffic flow.

The policy node 103 may be a Policy and Charging Rules Function, PCRF node; and the classifying node 101 may be a gateway node.

Some other embodiments described herein may be summarized in the following manner:

One embodiment is directed to a method in a classifying node 101 configured to receive and handle traffic flows in a communications system, the method comprising:

receiving from a policy node 103, information indicating a filter setting defining that a particular traffic flow should be associated with a label;

classifying received traffic flows based on the filter setting such that the particular traffic flow is identified;

associating, based on the classification, the particular traffic flow with the label such that the particular traffic flow comprises the label; and transmitting the particular traffic flow comprising the label to a Software Defined Network, SDN, switch 110 in a SDN 105, which SDN switch 110 is configured to pass the traffic flow through the SDN 105 based on the label.

The label may further indicate a direction of the traffic flow, which direction is uplink from a wireless device 125 to the SDN 105 or downlink from the SDN 105 to the wireless device 125.

At least one destination 115, 120 for the particular traffic flow may be an intermediate destination 115 configured to provide a service to be applied to the particular traffic flow.

The intermediate destination 115 may provide a service in a service chain.

The filter setting may further indicate which services to be used at a destination 115, 120 for the particular traffic flow.

The label may be a part of a data packet header of data packets in the particular traffic flow.

The label may be one of: at least a part of a flow label in an Internet Protocol version 6, IPv6, header of data packets in the particular traffic flow or at least a part of a label in an extension header in data packets of the particular traffic flow.

The particular traffic flow may be received from a wireless device (125).

The policy node 103 may be a Policy and Charging Rules Function, PCRF node, and the classifying node 101 may be a gateway node.

Some other embodiments described herein may be summarized in the following manner:

One embodiment is directed to a method in a Software Defined Network Controller, SDNC 108 configured to handle traffic flow in a communications system 100, the method comprising:

receiving information indicating a label setting from a policy node, which label setting identifies a label, a particular traffic flow that will pass through a Software Defined Network, SDN, 105 controlled by the SDNC 108, and one or more destinations 115, 120 for the particular traffic flow;

creating, based on said one or more destinations 115, 120, a path setting comprising the label and a path for the particular traffic flow through the SDN 105; and transmitting information indicating the path setting to one or more SDN switches 110 in the SDN 105.

The label setting may further indicate a source for the particular traffic flow.

At least one destination 115, 120 for the particular traffic flow may be an intermediate destination 115 configured to provide a service to be applied to the particular traffic flow.

The intermediate destination 115 may provide a service in a service chain.

The label setting may further indicate a direction of the traffic flow, which direction is uplink from a wireless device 125 to the SDN 105 or downlink from the SDN 105 to the wireless device 125.

The label setting may further indicate which services to be used at a destination 115, 120 for the particular traffic flow.

The label may be a part of a data packet header of data packets in the particular traffic flow.

The label may be one of: at least a part of a flow label in an Internet Protocol version 6, IPv6, header in data packets of the particular traffic flow or at least a part of a label in an extension header in data packets of the particular traffic flow.

The SDNC 108 and the classifying node 101 may have a common understanding of the label.

The SDNC 108 may be located outside the SDN 105 and the SDN switch(es) 110 may be located in the SDN 105.

The policy node 103 may be a Policy and Charging Rules Function, PCRF, node, and the classifying node 101 may be a gateway node.

Some other embodiments described herein may be summarized in the following manner:

One embodiment is directed to a policy node 103 configured to handle traffic flows in a communications system 100. The policy node 103 is configured to:

allocate a label setting identifying a label, a particular traffic flow that will pass through a Software Defined Network, SDN, 105, and one or more destinations 115, 120 for the particular traffic flow;

transmit information indicating the label-setting to a SDN Controller, SDNC 108 configured to create a path for the traffic flow through the SDN 105 based on the label and said one or more destinations 115, 120 identified by the label setting;

allocate a filter setting defining that the particular traffic flow should be associated with the label; and to transmit information indicating the filter setting to a classifying node 101 configured to receive the particular traffic flow and to associate the particular traffic flow with the label.

The label setting may further indicate a source for the particular traffic flow.

At least one of the destinations 115, 120 may be an intermediate destination 115 configured to provide a service to be applied to the particular traffic flow.

The intermediate destination 115 may provide a service in a service chain.

The filter setting may further indicate a direction of the traffic flow, which direction is uplink from a wireless device 125 to the SDN 105 or downlink from the SDN 105 to the wireless device 125.

The filter setting may further indicate which services to be used at a destination 115, 120 for the particular traffic flow.

The label may be a part of a data packet header of data packets in the particular traffic flow.

The label is one of: at least a part of a flow label in an Internet Protocol version 6, IPv6, header in data packets of the particular traffic flow or at least a part of a label in an extension header in data packets of the particular traffic flow.

The policy node 103 may be a Policy and Charging Rules Function, PCRF node, and the classifying node 101 may be a gateway node.

Some other embodiments described herein may be summarized in the following manner:

One embodiment is directed to a classifying node 101 configured to receive and handle traffic flows in a communications system, the classifying node 101 being further configured to:

receive from a policy node 103, information indicating a filter setting defining that a particular traffic flow should be associated with a label;

classify received traffic flows based on the filter setting such that the particular traffic flow is identified;

associate based on the classification, the particular traffic flow with the label such that the particular traffic flow comprises the label; and to transmit the particular traffic flow comprising the label to a Software Defined Network, SDN, switch 110 in a SDN 105, which SDN switch 110 is configured to pass the traffic flow through the SDN 105 based on the label.

The label may further indicate a direction of the traffic flow, which direction is uplink from a wireless device 125 to the SDN 105 or downlink from the SDN 105 to the wireless device 125.

At least one destination 115, 120 for the particular traffic flow may be an intermediate destination 115 configured to provide a service to be applied to the particular traffic flow.

The intermediate destination 115 may provide a service in a service chain.

The filter setting may further indicate which services to be used at a destination 115, 120 for the particular traffic flow.

The label may be a part of a data packet header of data packets in the particular traffic flow.

The label may be one of: at least a part of a flow label in an Internet Protocol version 6, IPv6, header of data packets in the particular traffic flow or at least a part of a label in an extension header in data packets of the particular traffic flow.

The particular traffic flow may be received from a wireless device 125.

The policy node 103 may be a Policy and Charging Rules Function, PCRF node, the classifying node 101 may be a gateway node.

Some other embodiments described herein may be summarized in the following manner:

One embodiment is directed to a Software Defined Network Controller, SDNC 108 configured to handle traffic flow in a communications system 100, the SDNC 108 being further configured to:

receive information indicating a label setting from a policy node 103, which label setting identifies a label, a particular traffic flow that will pass through a Software Defined Network, SDN, 105 controlled by the SDNC 108, and one or more destinations 115, 120 for the particular traffic flow;

create, based on said one or more destinations 115, 120, a path setting comprising the label and a path for the particular traffic flow through the SDN (105); and to transmit information indicating the path setting to one or more SDN switches 110 in the SDN 105.

The label setting may further indicate a source for the particular traffic flow.

At least one destination 115, 120 for the particular traffic flow may be an intermediate destination 115 configured to provide a service to be applied to the particular traffic flow.

The intermediate destination 115 may provide a service in a service chain.

The label setting may further indicate a direction of the traffic flow, which direction is uplink from a wireless device 125 to the SDN 105 or downlink from the SDN 105 to the wireless device 125.

The label setting may further indicate which services to be used at a destination 115, 120 for the particular traffic flow.

The label may be a part of a data packet header of data packets in the particular traffic flow.

The label may be one of: at least a part of a flow label in an Internet Protocol version 6, IPv6, header in data packets of the particular traffic flow or at least a part of a label in an extension header in data packets of the particular traffic flow.

The SDNC 108 and the classifying node 101 may have a common understanding of the label.

The SDNC 108 may be located outside the SDN 105 and the SDN switch 110 may be located in the SDN 105.

The policy node 103 may be a Policy and Charging Rules Function, PCRF, node, and the classifying node 101 may be a gateway node.

Some other embodiments described herein may be summarized in the following manner:

One embodiment is directed to a computer program comprising instructions which, when executed on at least one processor, cause the at least one processor to carry out the method according to any one of the embodiments described herein.

One embodiment is directed to a carrier comprising the computer program, wherein the carrier is one of an electronic signal, optical signal, radio signal or computer readable storage medium.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

The invention claimed is:

1. A method in a policy node configured to handle traffic flows in a communications system, the method comprising:
in a policy node separate from a Software Defined Network, SDN, controller:
allocating a label-setting identifying a label, a particular traffic flow that will pass through a Software Defined Network, SDN, and one or more destinations for the particular traffic flow, the label identifying at least one of: traffic from a defined source and having any destination; traffic having a defined destination and from any source; traffic from a defined application; and traffic requiring a defined set of one or more services and having any source or destination, wherein one label can be assigned to multiple flows and wherein multiple labels can be assigned to one flow, and wherein one label can be associated with multiple services and wherein multiple labels can be associated with one service;
transmitting information indicating the label-setting to the SDN Controller, SDNC, configured to create a path for the traffic flow through the SDN based on the label and said one or more destinations identified by the label-setting;
allocating a filter-setting defining that the particular traffic flow should be associated with the label; and
transmitting information indicating the filter-setting to a classifying node configured to receive the particular traffic flow and to associate the particular traffic flow with the label.

2. The method according to claim 1, wherein the label-setting further indicates a source for the particular traffic flow.

3. The method according to claim 1, wherein at least one of the destinations is an intermediate destination configured to provide a service to be applied to the particular traffic flow.

4. The method according to claim 1, wherein the filter-setting further indicates which services to be used at a destination for the particular traffic flow.

5. The method according to claim 1, wherein the label is one of: at least a part of a flow label ln an Internet Protocol version 6, IPv6, header in data packets of the particular traffic flow and at least a part of a label in an extension header in data packets of the particular traffic flow.

6. A method in a classifying node configured to receive and handle traffic flows in a communications system, the method comprising:
receiving from a policy node, information indicating a filter-setting defining that a particular traffic flow should be associated with one or more labels, each of the one or more labels identifying at least one of: traffic from a defined source and having any destination; traffic having a defined destination and from any source; traffic from a defined application; and traffic requiring a defined set of one or more services and having any source or destination, wherein one label can be assigned to multiple flows and wherein multiple labels can be assigned to one flow, and wherein one label can be associated with multiple services and wherein multiple labels can be associated with one service;
classifying received traffic flows based on the filter-setting such that the particular traffic flow is identified;
associating based on the classification, the particular traffic flow with the label such that the particular traffic flow comprises the label; and
transmitting the particular traffic flow comprising the label to a Software Defined Network, SDN, switch in a SDN, which SDN switch is configured to pass the traffic flow through the SDN based on the label.

7. A method in a Software Defined Network Controller, SDNC configured to handle traffic flow in a communications system, the method comprising:
receiving information indicating a label-setting from a policy node, which label-setting identifies a label, a particular traffic flow that will pass through a Software Defined Network, SDN, controlled by the SDNC, and one or more destinations for the particular traffic flow, the label identifying at least one of: traffic from a defined source and having any destination; traffic having a defined destination and from any source; traffic from a defined application; and traffic requiring a defined set of one or more services and having any source or destination, wherein one label can be assigned to multiple flows and wherein multiple labels can be assigned to one flow, and wherein one label can be associated with multiple services and wherein multiple labels can be associated with one service;
creating, based on said one or more destinations, a path-setting comprising the label and a path for the particular traffic flow through the SDN; and
transmitting information indicating the path-setting to one or more SDN switches in the SDN.

8. The method according to claim 7, wherein the label-setting further indicates a source for the particular traffic flow.

9. The method according to claim 7, wherein at least one destination for the particular traffic flow is an intermediate destination configured to provide a service to be applied to the particular traffic flow.

10. The method according to claim 7, wherein the label-setting further indicates which services to be used at a destination for the particular traffic flow.

11. The method according to claim 7, wherein the label is one of: at least a part of a flow label in an Internet Protocol version 6, IPv6, header in data packets of the particular traffic flow and at least a part of a label in an extension header in data packets of the particular traffic flow.

12. The method according to claim 7, wherein the SDNC and the classifying node have a common understanding of the label.

13. A policy node configured to handle traffic flows in a communications system, the policy node being separate from a Software Defined Network, SDN, controller and further configured to:
allocate a label-setting identifying a label, a particular traffic flow that will pass through a Software Defined Network, SDN, and one or more destinations for the particular traffic flow, the label identifying at least one of: traffic from a defined source and having any destination; traffic having a defined destination and from any source; traffic from a defined application; and traffic requiring a defined set of one or more services and having any source or destination, wherein one label can be assigned to multiple flows and wherein multiple labels can be assigned to one flow, and wherein one label can be associated with multiple services and wherein multiple labels can be associated with one service;

transmit information indicating the label-setting to a SDN Controller, SDNC configured to create a path for the traffic flow through the SDN based on the label and said one or more destinations identified by the label-setting;

allocate a filter-setting defining that the particular traffic flow should be associated with the label; and to transmit information indicating the filter-setting to a classifying node configured to receive the particular traffic flow and to associate the particular traffic flow with the label.

14. A Software Defined Network Controller, SDNC configured to handle traffic flow in a communications system, the SDNC being further configured to:

receive information indicating a label-setting from a policy node, which label-setting identifies a label, a particular traffic flow that will pass through a Software Defined Network, SDN, controlled by the SDNC, and one or more destinations for the particular traffic flow, the label identifying at least one of: traffic from a defined source and having any destination; traffic having a defined destination and from any source; traffic from a defined application; and traffic requiring a defined set of one or more services and having any source or destination, wherein one label can be assigned to multiple flows and wherein multiple labels can be assigned to one flow, and wherein one label can be associated with multiple services and wherein multiple labels can be associated with one service;

create, based on said one or more destinations, a path-setting comprising the label and a path for the particular traffic flow through the SDN; and to transmit information indicating the path-setting to one or more SDN switches in the SDN.

* * * * *